United States Patent
Talukdar et al.

(10) Patent No.: US 12,245,081 B2
(45) Date of Patent: Mar. 4, 2025

(54) THRESHOLD-BASED REPORTING FOR EFFICIENT ADMISSION CONTROL SUPPORT FOR WIRELESS NETWORKS

(71) Applicant: Nokia Technologies Oy, Espoo (FI)

(72) Inventors: Anup Talukdar, Naperville, IL (US); Ilkka Antero Keskitalo, Oulu (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 384 days.

(21) Appl. No.: 17/775,200

(22) PCT Filed: Nov. 3, 2020

(86) PCT No.: PCT/EP2020/080772
§ 371 (c)(1),
(2) Date: May 6, 2022

(87) PCT Pub. No.: WO2021/089519
PCT Pub. Date: May 14, 2021

(65) Prior Publication Data
US 2022/0400411 A1 Dec. 15, 2022

Related U.S. Application Data

(60) Provisional application No. 62/931,829, filed on Nov. 7, 2019.

(51) Int. Cl.
*H04W 28/12* (2009.01)
*H04W 28/02* (2009.01)
*H04W 84/04* (2009.01)

(52) U.S. Cl.
CPC ....... *H04W 28/12* (2013.01); *H04W 28/0252* (2013.01); *H04W 84/047* (2013.01)

(58) Field of Classification Search
None
See application file for complete search history.

(56) References Cited

U.S. PATENT DOCUMENTS

2012/0149411 A1* 6/2012 Miyoshi ............... H04B 7/0413
455/501
2013/0143574 A1 6/2013 Teyeb et al.
(Continued)

FOREIGN PATENT DOCUMENTS

WO 2021089519 A1 5/2021

OTHER PUBLICATIONS

"Admission Control during BH RLC Channel establishment"; Nokia, et al.; R3-195533; Agenda item 13.2.1.2; 3GPP TSG-WG3 Meeting #105bis; Chongping, China; Oct. 14-18, 2019; 5 pgs. https://ftp.3gpp.org/tsg_ran/WG3_lu/TSGR3_105bis/Docs/R3-195533.zip.
(Continued)

Primary Examiner — Kenny S Lin
(74) Attorney, Agent, or Firm — Lippes Mathias LLP

(57) ABSTRACT

According to an example embodiment, a method may include transmitting, to at least one integrated access backhaul (IAB) (e.g., relay) node within a wireless network, link capacity threshold information, wherein the at least one IAB node is requested to perform threshold-based reporting of updated link capacity based on the link capacity threshold information; and receiving, from a first IAB node of the at least one IAB node, an updated link capacity report that was triggered (e.g., caused to be generated and/or transmitted) at the IAB node based on a change of available link capacity of the IAB node with respect to the capacity threshold information, the updated link capacity report indicating updated available link capacity of at least one a child backhaul link or at least one access link of the first IAB node.

20 Claims, 12 Drawing Sheets

(56) References Cited

U.S. PATENT DOCUMENTS

| | | | |
|---|---|---|---|
| 2015/0103812 A1* | 4/2015 | Zhao | H04W 48/16 370/338 |
| 2018/0159600 A1* | 6/2018 | Kim | H04B 7/066 |
| 2021/0028916 A1* | 1/2021 | Huang | H04L 5/14 |
| 2021/0400560 A1* | 12/2021 | Wu | H04W 40/12 |
| 2022/0038994 A1* | 2/2022 | Wei | H04W 40/22 |
| 2022/0345285 A1* | 10/2022 | You | H04W 72/23 |

OTHER PUBLICATIONS

"Details of hop-by-hop flow control"; Nokia, et al.; R2-191209; Agenda item 6.1.3.3; 3GPP TSG-RAN WG2 Meeting #107bis; Chongping, Chaina; Oct. 14-18, 2019; 3 pgs. https://ftp.3gpp.org/tsg_ran/WG2_RL2/TSGR2_107bis/Docs/R2-1913209.zip.

"Downlink hop-by-hop flow control"; Samsung; R2-1912576; Agenda item 6.1.3.3; 3GPP TSG-RAN WG2 #107-bis; Chongping, People's Republic of China; Oct. 14-18, 2019; 4 pgs. https://ftp.3Gpp.org/tsg_ran/WG2_RL2/TSGR2_107bis/Docs/R2-1912576.zip.

"Admission Control during BH RLC Channel establishment"; Nokia, et al.; R3-196762; Agenda item 13.2.1.3; 3GPP TSG-WG3 Meeting #106; Renov, NV; Nov. 18-22, 2019; 5 pgs. https://ftp.3gpp.org/tsg_ran/WG3_lu/TSGR3_106/Docs/R3-196762.zip.

\* cited by examiner

THRESHOLD-BASED REPORTING FOR EFFICIENT ADMISSION CONTROL SUPPORT FOR WIRELESS NETWORKS

CROSS-REFERENCE TO RELATED APPLICATION

This application is the National Stage of, and therefore claims the benefit of, International Application No. PCT/EP2020/080772 filed on Nov. 3, 2020, entitled "THRESHOLD-BASED REPORTING FOR EFFICIENT ADMISSION CONTROL SUPPORT FOR WIRELESS NETWORKS," which was published in English under International Publication Number WO 2021/089519 on May 14, 2021, which claims priority to U.S. Provisional Patent Application No. 62/931,829, filed Nov. 7, 2019. The above applications are commonly assigned with this National Stage application and incorporated herein by reference in their entirety.

TECHNICAL FIELD

This description relates to wireless communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the $3^{rd}$ Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's Long Term Evolution (LTE) upgrade path for mobile networks. In LTE, base stations or access points (APs), which are referred to as enhanced Node AP (eNBs), provide wireless access within a coverage area or cell. In LTE, mobile devices, or mobile stations are referred to as user equipments (UE). LTE has included a number of improvements or developments. Aspects of LTE are also continuing to improve.

5G New Radio (NR) development is part of a continued mobile broadband evolution process to meet the requirements of 5G, similar to earlier evolution of 3G & 4G wireless networks. 5G is also targeted at the new emerging use cases in addition to mobile broadband. A goal of 5G is to provide significant improvement in wireless performance, which may include new levels of data rate, latency, reliability, and security. 5G NR may also scale to efficiently connect the massive Internet of Things (IoT) and may offer new types of mission-critical services. For example, ultra-reliable and low-latency communications (URLLC) devices may require high reliability and very low latency.

SUMMARY

Various example embodiments are described and/or illustrated.

According to an example embodiment, an apparatus may include at least one processor; and at least one memory including computer program code; the at least one memory and the computer program code configured to, with the at least one processor, cause the apparatus at least to: transmit, to at least one integrated access backhauling (IAB) node within a wireless network, link capacity threshold information, wherein the at least one IAB node is requested to perform threshold-based reporting of updated link capacity based on the link capacity threshold information; and receive, from a first IAB node of the at least one IAB node, an updated link capacity report that was triggered at the IAB node based on a change of available link capacity of the IAB node with respect to the capacity threshold information, the updated link capacity report indicating updated available link capacity of at least one a child backhaul link or at least one access link of the first IAB node.

According to an example embodiment, an apparatus may include at least one processor; and at least one memory including computer program code; the at least one memory and the computer program code configured to, with the at least one processor, cause the apparatus at least to: receive, by an integrated access backhauling (IAB) node within a wireless network, link capacity threshold information, wherein the IAB node is requested to perform threshold-based reporting of updated link capacity based on the link capacity threshold information; and transmit, by the IAB node, an updated link capacity report that was triggered at the IAB node based on a change of available link capacity of the IAB node with respect to the capacity threshold information, the updated link capacity report indicating updated available link capacity of at least one a child backhaul link or at least one access link of the IAB node.

According to an example embodiment, an apparatus may include at least one processor; and at least one memory including computer program code; the at least one memory and the computer program code configured to, with the at least one processor, cause the apparatus at least to: determine a link capacity threshold value; receive a link capacity report indicating an available link capacity of at least one a child backhaul link or at least one access link of an integrated access backhauling (IAB) node within a wireless network; receive an admission request for a flow, including receiving a capacity requirement for the flow; compare the capacity requirement for the flow to the available link capacity of the IAB node; determine that the flow is admissible if the capacity requirement of the flow is less than or equal to the available link capacity of the IAB node minus the link capacity threshold value; and determine that the flow is not admissible if the capacity requirement of the flow is greater than or equal to the available link capacity of the IAB node plus the link capacity threshold value.

According to an example embodiment, an apparatus may include at least one processor; and at least one memory including computer program code; the at least one memory and the computer program code configured to, with the at least one processor, cause the apparatus at least to: determine at least one absolute capacity threshold value; receiving a link capacity report indicating an available link capacity of at least one a child backhaul link or at least one access link of an integrated access backhauling (IAB) node within a wireless network; receive an admission request for a flow, including receiving a capacity requirement for the flow; determine that the flow is admissible if both: the capacity requirement of the flow is less than or equal to a first absolute capacity threshold value of the at least one absolute capacity threshold value, and the available link capacity of the at least one child backhaul link or the at least one access link of the IAB node is greater than or equal to the available link capacity of the IAB node; and determine that the flow is not admissible if both: the capacity requirement of the flow is greater than or equal to a first absolute capacity threshold value, and the available link capacity of the at least one child backhaul link or the at least one access link of the IAB node is less than the available link capacity of the IAB node; and, otherwise, sending a request to the IAB node for an updated link capacity report indicating an updated available link capacity of the at least one child backhaul link or the at least one access link of the IAB.

According to an example embodiment, a method may include transmitting, to at least one integrated access backhauling (IAB) node within a wireless network, link capacity threshold information, wherein the at least one IAB node is requested to perform threshold-based reporting of updated link capacity based on the link capacity threshold information; and receiving, from a first IAB node of the at least one IAB node, an updated link capacity report that was triggered at the IAB node based on a change of available link capacity of the IAB node with respect to the capacity threshold information, the updated link capacity report indicating updated available link capacity of at least one a child backhaul link or at least one access link of the first IAB node.

According to an example embodiment, a method may include receiving, by an integrated access backhauling (IAB) node within a wireless network, link capacity threshold information, wherein the IAB node is requested to perform threshold-based reporting of updated link capacity based on the link capacity threshold information; and transmitting, by the IAB node, an updated link capacity report that was triggered at the IAB node based on a change of available link capacity of the IAB node with respect to the capacity threshold information, the updated link capacity report indicating updated available link capacity of at least one a child backhaul link or at least one access link of the IAB node.

According to an example embodiment, a method is provided of performing admission control for a flow, comprising: determining a link capacity threshold value; receiving a link capacity report indicating an available link capacity of at least one a child backhaul link or at least one access link of an integrated access backhauling (IAB) node within a wireless network; receiving an admission request for a flow, including receiving a capacity requirement for the flow; comparing the capacity requirement for the flow to the available link capacity of the IAB node; determining that the flow is admissible if the capacity requirement of the flow is less than or equal to the available link capacity of the IAB node minus the link capacity threshold value; and determining that the flow is not admissible if the capacity requirement of the flow is greater than or equal to the available link capacity of the IAB node plus the link capacity threshold value.

According to an example embodiment, a method may include determining at least one absolute capacity threshold value; receiving a link capacity report indicating an available link capacity of at least one a child backhaul link or at least one access link of an integrated access backhauling (IAB) node within a wireless network; receiving an admission request for a flow, including receiving a capacity requirement for the flow; determining that the flow is admissible if both: the capacity requirement of the flow is less than or equal to a first absolute capacity threshold value of the at least one absolute capacity threshold value, and the available link capacity of the at least one child backhaul link or the at least one access link of the IAB node is greater than or equal to the available link capacity of the IAB node; and determining that the flow is not admissible if both: the capacity requirement of the flow is greater than or equal to a first absolute capacity threshold value, and the available link capacity of the at least one child backhaul link or the at least one access link of the IAB node is less than the available link capacity of the IAB node; otherwise, sending a request to the IAB node for an updated link capacity report indicating an updated available link capacity of the at least one child backhaul link or the at least one access link of the IAB.

The details of one or more examples of embodiments are set forth in the accompanying drawings and the description below. Other features will be apparent from the description and drawings, and from the claims.

DETAILED DESCRIPTION

Figure 1:
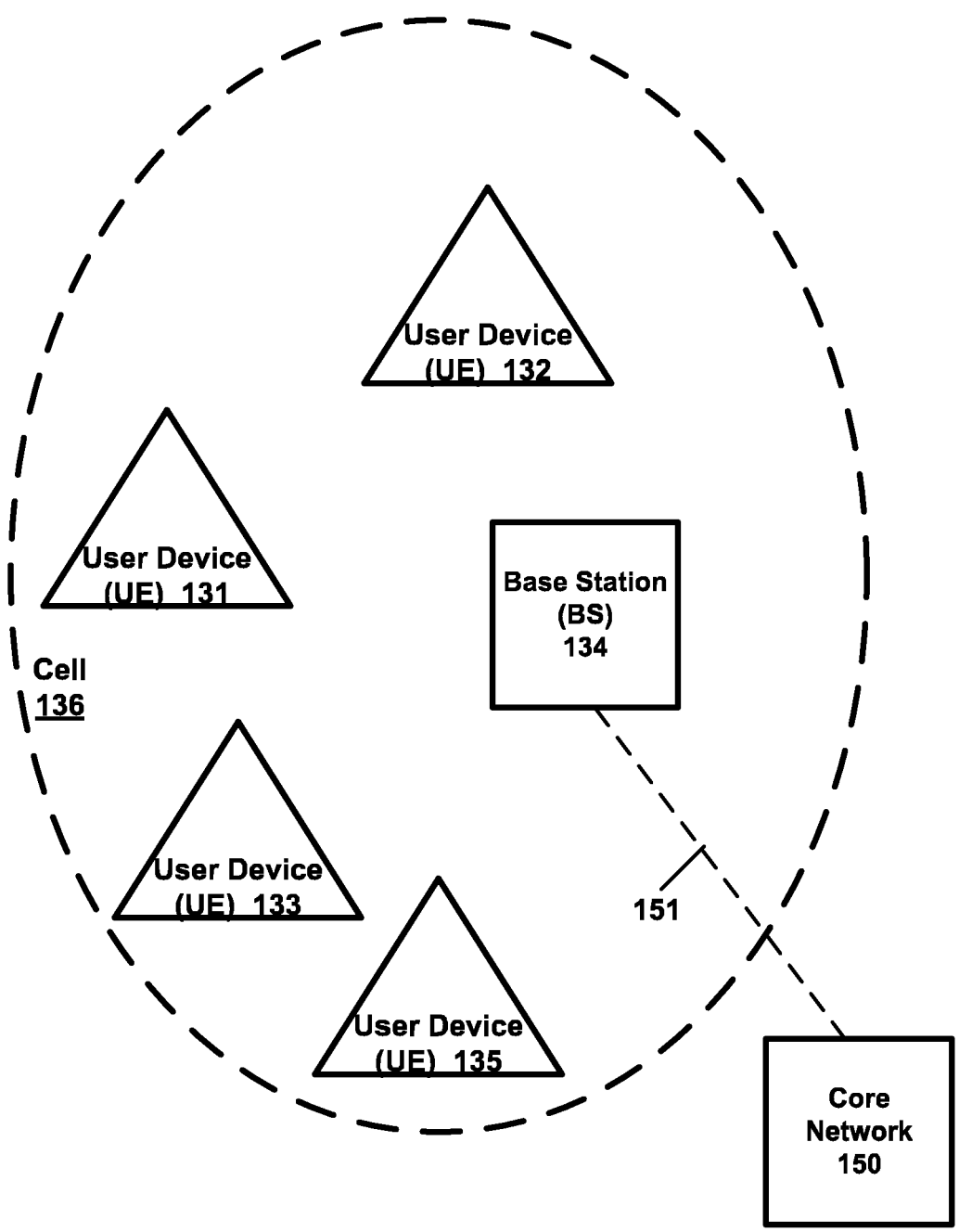
FIG. 1 is a block diagram of a wireless network according to an example embodiment.

FIG. 1 is a block diagram of a wireless network 130 according to an example embodiment. In the wireless network 130 of FIG. 1, user devices 131, 132, 133 and 135, which may also be referred to as mobile stations (MSs) or user equipment (UEs), may be connected (and in communication) with a base station (BS) 134, which may also be referred to as an access point (AP), an enhanced Node B (eNB), a BS, next generation Node B (gNB), a next generation enhanced Node B (ng-eNB), or a network node. The terms user device and user equipment (UE) may be used interchangeably. A BS may also include or may be referred to as a RAN (radio access network) node, and may include a portion of a BS or a portion of a RAN node, such as (e.g., such as a centralized unit (CU) and/or a distributed unit (DU) in the case of a split BS). At least part of the functionalities of a BS (e.g., access point (AP), base station (BS) or (e)Node B (eNB), BS, RAN node) may also be carried out by any node, server or host which may be operably coupled to a transceiver, such as a remote radio head. BS (or AP) 134 provides wireless coverage within a cell 136, including to user devices (or UEs) 131, 132, 133 and 135. Although only four user devices (or UEs) are shown as being connected or attached to BS 134, any number of user devices may be provided. BS 134 is also connected to a core network 150 via a Si interface or NG interface 151. This is merely one simple example of a wireless network, and others may be used.

A base station (e.g., such as BS 134) is an example of a radio access network (RAN) node within a wireless network. A BS (or a RAN node) may be or may include (or may alternatively be referred to as), e.g., an access point (AP), a gNB, an eNB, or portion thereof (such as a centralized unit (CU) and/or a distributed unit (DU) in the case of a split BS or split gNB), or other network node.

According to an illustrative example, a BS node (e.g., BS, eNB, gNB, CU/DU, . . . ) or a radio access network (RAN) may be part of a mobile telecommunication system. A RAN (radio access network) may include one or more BSs or RAN nodes that implement a radio access technology, e.g., to allow one or more UEs to have access to a network or core network. Thus, for example, the RAN (RAN nodes, such as BSs or gNBs) may reside between one or more user devices or UEs and a core network. According to an example embodiment, each RAN node (e.g., BS, eNB, gNB, CU/DU, . . . ) or BS may provide one or more wireless communication services for one or more UEs or user devices, e.g., to allow the UEs to have wireless access to a network, via the RAN node. Each RAN node or BS may perform or provide wireless communication services, e.g., such as allowing UEs or user devices to establish a wireless connection to the RAN node, and sending data to and/or receiving data from one or more of the UEs. For example, after establishing a connection to a UE, a RAN node (e.g., BS, eNB, gNB, CU/DU, . . . ) may forward data to the UE that is received from a network or the core network, and/or forward data received from the UE to the network or core network. RAN nodes (e.g., BS, eNB, gNB, CU/DU, . . . ) may perform a wide variety of other wireless functions or services, e.g., such as broadcasting control information (e.g., such as system information) to UEs, paging UEs when there is data to be delivered to the UE, assisting in handover of a UE between cells, scheduling of resources for uplink data transmission from the UE(s) and downlink data transmission to UE(s), sending control information to configure one or more UEs, and the like. These are a few examples of one or more functions that a RAN node or BS may perform. A base station may also be DU (Distributed Unit) part of IAB (Integrated Access and Backhaul) node (a.k.a. a relay node). DU facilitates the access link connection(s) for an IAB node.

A user device (user terminal, user equipment (UE), mobile terminal, handheld wireless device, etc.) may refer to a portable computing device that includes wireless mobile communication devices operating either with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, a vehicle, a sensor, and a multimedia device, as examples, or any other wireless device. It should be appreciated that a user device may also be (or may include) a nearly exclusive uplink only device, of which an example is a camera or video camera loading images or video clips to a network. A user device may be also MT (Mobile Termination) part of IAB (Integrated Access and Backhaul) node (a.k.a. a relay node). MT facilitates the backhaul connection for an IAB node.

In LTE (as an illustrative example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks. Other types of wireless networks, such as 5G (which may be referred to as New Radio (NR)) may also include a core network.

In addition, by way of illustrative example, the various example embodiments or techniques described herein may be applied to various types of user devices or data service types, or may apply to user devices that may have multiple applications running thereon that may be of different data service types. New Radio (5G) development may support a number of different applications or a number of different data service types, such as for example: machine type communications (MTC), enhanced machine type communication (eMTC), Internet of Things (IoT), and/or narrowband IoT user devices, enhanced mobile broadband (eMBB), and ultra-reliable and low-latency communications (URLLC). Many of these new 5G (NR)—related applications may require generally higher performance than previous wireless networks.

IoT may refer to an ever-growing group of objects that may have Internet or network connectivity, so that these objects may send information to and receive information from other network devices. For example, many sensor type applications or devices may monitor a physical condition or a status, and may send a report to a server or other network device, e.g., when an event occurs. Machine Type Communications (MTC, or Machine to Machine communications) may, for example, be characterized by fully automatic data generation, exchange, processing and actuation among intelligent machines, with or without intervention of humans. Enhanced mobile broadband (eMBB) may support much higher data rates than currently available in LTE.

Ultra-reliable and low-latency communications (URLLC) is a new data service type, or new usage scenario, which may be supported for New Radio (5G) systems. This enables emerging new applications and services, such as industrial automations, autonomous driving, vehicular safety, e-health services, and so on. 3GPP targets in providing connectivity with reliability corresponding to block error rate (BLER) of $10^{-5}$ and up to 1 ms U-Plane (user/data plane) latency, by way of illustrative example. Thus, for example, URLLC user devices/UEs may require a significantly lower block error rate than other types of user devices/UEs as well as low latency (with or without requirement for simultaneous high reliability). Thus, for example, a URLLC UE (or URLLC application on a UE) may require much shorter latency, as compared to a eMBB UE (or an eMBB application running on a UE).

The various example embodiments may be applied to a wide variety of wireless technologies or wireless networks, such as LTE, LTE-A, 5G (New Radio (NR)), cmWave, and/or mmWave band networks, IoT, MTC, eMTC, eMBB, URLLC, etc., or any other wireless network or wireless technology. These example networks, technologies or data service types are provided only as illustrative examples.

In LTE (as an example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks.

According to an example embodiment, a base station (BS) or gNB may be a single logical node, or it may include of a central (or centralized) unit (CU) and one or more distributed units (DUs). A CU may be a logical node hosting radio resource control (RRC) entity, service data adaptation protocol (SDAP) entity and packet data convergence protocol (PDCP) entity of the gNB that controls operation of one or more DUs. A DU may be a logical node hosting radio link control (RLC) entity/entities, medium access control (MAC) entity/entities, and a physical layer (PHY) entity/entities of the gNB. The CU and the DUs it controls may be connected via a F1 interface, for example (e.g., over wired or wireless links), which may be used for conveying the lower layer configuration information to the DUs of radio bearers between the CU and DU, as well as the setting up of the GTP tunnel between DU and CU for each radio bearer. For example, an advantage or feature for the CU/DU functional split may include that most or all of the time-critical functions such as data scheduling of users/UEs, fast retransmission, segmentation, etc., may be performed in the DU (e.g., very close to the radio and antenna of the gNB), while other less time-critical functions of the gNB may be centralized in a CU (e.g., in a CU or within a BS, on a server in the cloud, or other location or network node).

In many example wireless networks, a BS or gNB (RAN node) may provide wireless connections and wireless services to one or more UEs that are connected to the gNB. The BS or gNB is also typically connected over a wired backhaul link to the core network (CN). However, in some wireless networks, not all gNBs or BSs may be connected to the core network (CN) via a wired (e.g., fiber optic) backhaul link. That is, in some cases, part of the wireless spectrum may be used to provide backhauling (e.g., connections between the gNB/BS and the CN) over wireless links, e.g., where one or more gNBs (or DUs) may be connected to a core network over at least one hop that is a wireless link. Thus, in such a case, the wireless networks may include one or more integrated access and backhauling (IAB) nodes (e.g., which may also be referred to as relay nodes).

An IAB node may refer to a network node that may provide both a backhaul (backhauling) wireless link to a donor IAB node or a parent IAB node, and an access link that allows wireless connections with one or more UEs. Therefore, an IAB node (or relay node) may provide or include two types of wireless links, including a backhaul link and an access link. For example, the backhaul link may provide (at least one hop of) a wireless connection to another IAB node, while the access link allows UEs to be served by the IAB node. In some cases, a multi-hop communication path from a UE to a donor IAB node may be provided, that may include a plurality of IAB nodes. Thus, multi-hop IAB networks may be provided where one or more IAB nodes (e.g., relay nodes) may be provided, and may extend coverage of wireless services. Thus, for example, wireless networks that employ IAB nodes may allow for increased density of users/UEs and provide extended wireless range of a BS/gNB, without requiring an increased presence or density of wired (e.g., fiber) links between BSs/gNBs and the core network.

According to an example embodiment, an IAB node (or relay node) may include two parts, including BS part (or DU part) that may provide wireless services via access links to one or more UEs, and a mobile termination (MT) (or UE) part that may establish or perform a communication via wireless backhaul link to a parent IAB node or a donor IAB node. Thus, each IAB node may include both a BS or DU function (to communicate with local UEs via access links), and a MT (mobile termination) or UE function that may communicate over a backhaul link to a parent IAB node. As noted, a donor IAB node may be typically connected via a wired link to the CN; while a parent IAB node may be the next hop IAB node that may be either the donor IAB node (e.g., connected to the CN via wired backhaul link) or one hop closer to the donor IAB node. A parent IAB node may have a child backhaul (wireless) link established to another (e.g., a child) IAB node.

In some cases, one or more example embodiments may be related to 5G New Radio (NR) design. The 5G NR should (or may) allow network deployment with minimized manual efforts and as much automated self-configuration as possible. Especially on higher frequency bands the coverage will be an issue and specific capabilities are needed for NR to enable easy coverage extension with minimized/none requirements for network (re-)planning in a fast and cost-efficient manner. Mainly for these reasons NR may include a requirement to support wireless backhaul to connect relay nodes (also referred to as Integrated Access and Backhaul nodes (IAB nodes)) with each other and to base stations with fixed connection. More specifically, NR may also support self-backhauling where the same carrier is used for backhaul connection as well as for the access links, i.e., enabling in-band backhaul operation.

The 5G NR base stations may overcome the impacts of high path loss, particularly in the higher frequency bands above 6 GHz, by using beamformed channels over narrow beams for communications to achieve the required capacity and coverage. Due to the severe shadowing loss characteristics in these bands, the radio links between a UE and its serving IAB-node/IAB-donor and the backhaul links between IAB nodes are susceptible to when the narrow beams are blocked by obstacles such as pedestrians, moving vehicles as well as user movements. In the event of such abrupt radio link blockages, the UE and the IAB nodes need to restore their connectivity by attaching to alternate IAB nodes.

In an example embodiment, a specific relaying node (RN), also known as an Integrated Access and Backhaul (IAB) node (IAB-node), may have a wireless backhaul connection (instead of having a wired backhaul connection) to a Donor gNB (DgNB), also known as IAB-donor, a base station with a wired connection to the network backhaul or core network (CN).

Figure 2:
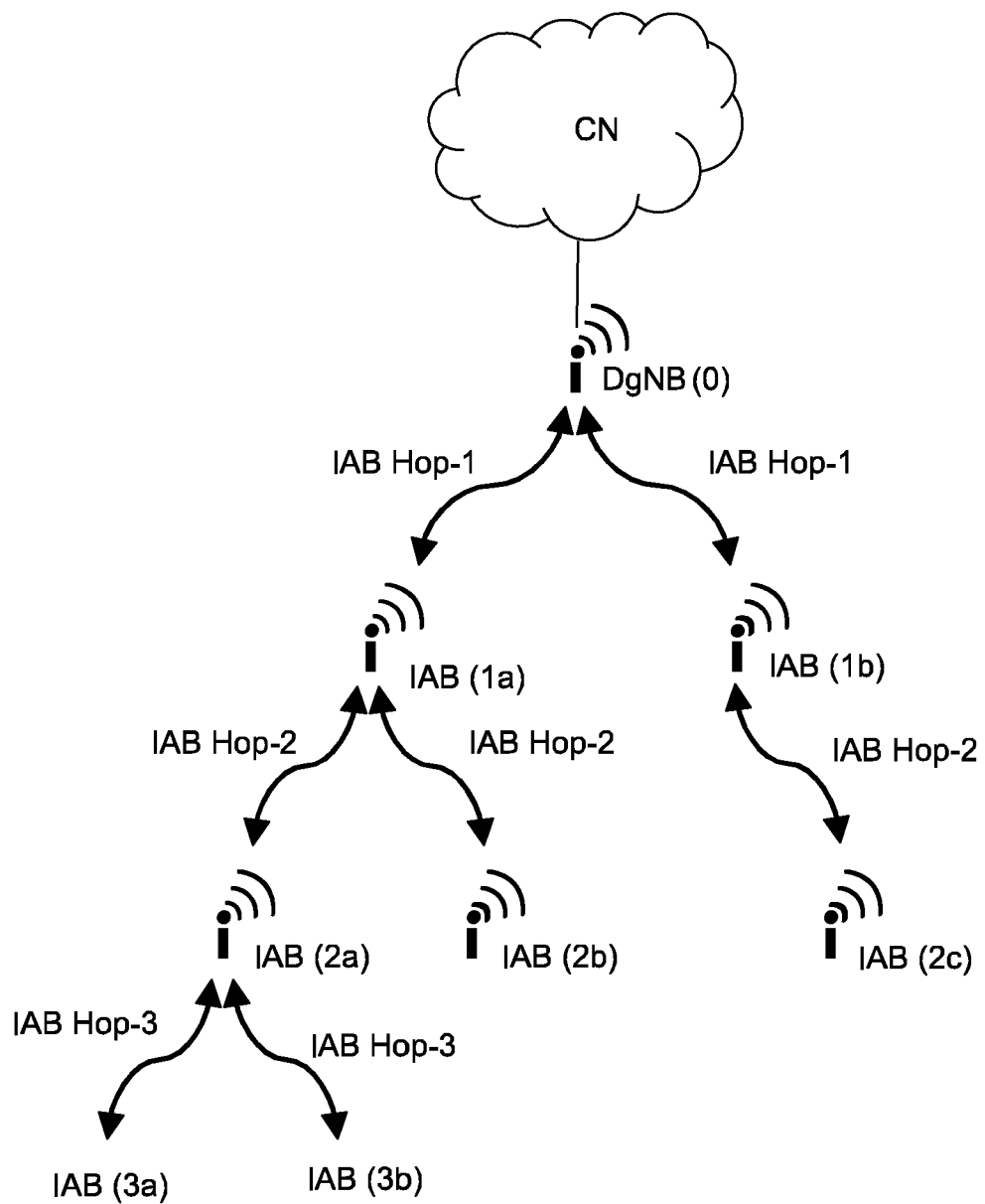
FIG. 2 is a diagram illustrating an integrated access and backhaul tree showing connections between IAB nodes and a donor gNB according to an example embodiment.

FIG. 2 is a diagram illustrating an integrated access and backhaul tree showing connections between IAB nodes and a donor gNB according to an example embodiment. The IAB network will be connected wirelessly with each IAB-node receiving service from a parent node and may provide service to the next hop IAB-node, its child. FIG. 2 illustrates a 3 hop IAB network where:

IAB-nodes (1a) and (1b) receiving backhaul service from the parent Donor gNB (0);
IAB-nodes (2a) and (2b) receiving backhaul service from the parent IAB-node (1a);
IAB-nodes (2c) receiving backhaul service from the parent IAB-node (1b); and
IAB-nodes (3a) and (3b) receiving service from the parent IAB-node (2a).

The donor gNB node (DgNB) is connected via wired link to the core network (CN).

The IAB network will provide wireless access to a plurality of UEs where each UE will connect directly to a Donor gNB or an IAB-node. IAB node (1b) is a parent IAB node for IAB node (2c). Also, for example, on the right side (or right branch) of FIG. 2, the wireless link identified as IAB Hop-2 is a child backhaul link of IAB node (1b). Similarly, on the left side (or left branch), IAB node (1a) is a parent IAB node of IAB node (2a), and the wireless link identified as IAB Hop-2 (on the left branch) is a child backhaul link of IAB node (1a). An IAB node may have two radio/wireless links—a parent link, and a child link: Parent link is a radio (e.g., backhaul) link from a MT of an IAB to the DU of the parent IAB node. (parent being closer to IAB donor node). Child backhaul link is the wireless backhaul link from DU of IAB node to the MT of a child IAB node. Access link is a wireless link from DU of a serving (serving a UE) IAB node to the UE. Thus, access link is a DU-UE wireless link. An IAB can provide both a child backhaul link and access link(s). Some IABs may just provide one of those.

The Donor gNB node and IAB-nodes share the wireless resources between backhaul and access links. The resources may include wireless spectrum and wireless transceivers. These wireless resources may be time, frequency and/or spatially multiplexed.

Figure 3:
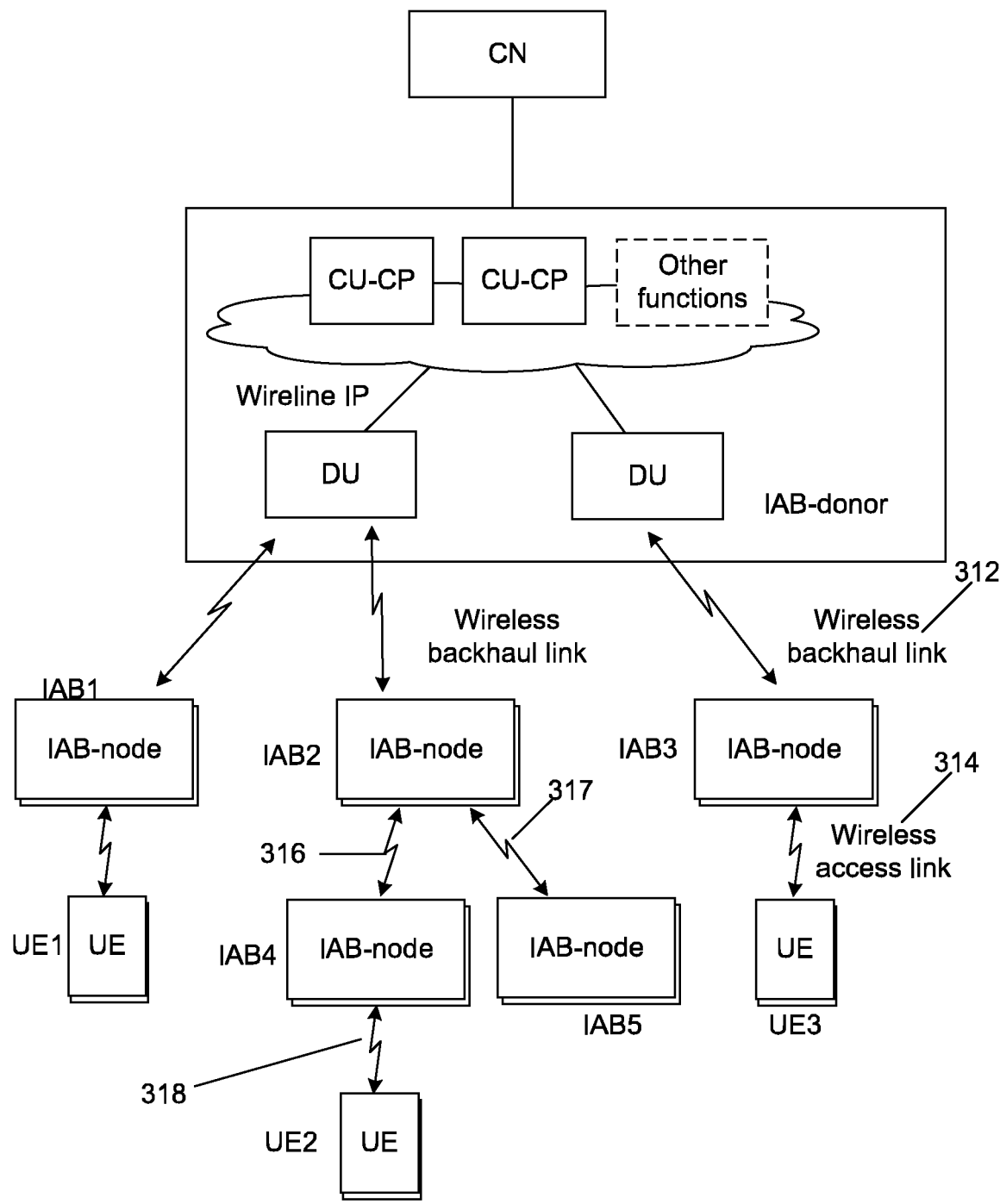
FIG. 3 is a reference diagram for IAB architecture.

FIG. 3 is a reference diagram for IAB architecture. In this example architecture shown in FIG. 3, the existing NR functions and interfaces, in particular, the Mobile-Termination (MT), gNB-DU, gNB-CU, UPF, AMF and SMF as well as the corresponding interfaces NR Uu (between MT and gNB), F1, NG, X2 and N4 are used as baseline. Also, for example, DUE of IAB donor node may include a child backhaul link 312. Also, IAB node IAB3 may be connected or communicate over both wireless backhaul link 312, and wireless access link 314. IAB node IAB3 may provide wireless services to UE3 (user equipment or user device) over access link 314, for example. Also, IAB node IAB2 is a parent IAB node for IAB node IAB4. IAB node IAB2 may provide a child backhaul link 316 to child IAB node IAB4, and another child backhaul link 317 to child IAB node IAB5.

As shown in FIG. 3, the IAB-donor may include a set of functions including gNB-DU, gNB-CU-CP and gNB-CU-UP and potentially other functions. The IAB-node will be composed of a MT function that terminates the radio interface layers of the backhaul Uu interface towards the IAB-donor or other IAB-nodes. and a gNB-DU function for providing wireless access for both UEs and child (next hop) IAB-nodes.

The MT function of an IAB node receives its backhaul service from a single parent IAB-node or a single IAB-donor and its DU function may serve the MT functions of one or more child IAB-nodes. Thus, the IAB-nodes served by a single IAB-donor are interconnected in a tree topology. However, the proposed invention is applicable also in a Directed Acyclic Graph (DAG) topology where an MT can maintain connectivity to more than one DUs which may be parent IAB-node DUs or IAB-donor DUs, or a combination of both. A MT may connect to multiple parent DUs, which can be IAB-node DUs, or IAB-donor DUs or both.

In an example embodiment, when a UE establishes an RRC connection or initiates a service flow, the UE context needs to be established at the IAB-donor and the intermediate IAB-nodes along the route to the UE. This UE context may include the QoS parameters for radio bearers. The service flows are mapped to RLC channels on each hop; a new RLC channel may be established or the flow may be mapped to an existing RLC channel. In either case, the RLC (radio link control) channels need to be configured with the QoS (quality of service) attributes of the flow. Additionally, it may be necessary to perform admission control for each hop along the route from the IAB-donor to the serving IAB-node. Since in an IAB network, the radio resources of an IAB node is shared among the access and the wireless backhaul links, the available capacity of those links for new service flows (or for ongoing service flow being re-routed along a new route) may change over time. For example, when a UE moves away from its base station, it may need to be allocated more radio resources from its serving cell to maintain its QoS guarantees; as a result, the available capacities for new flows to be served by the access link or the backhaul links of the cell will be reduced. Thus, admission control is required at initial service flow setup and also when rerouting of the flow is required due to UE handoff or BH (backhaul) link failures. In the rest of this description, the term 'JAB node' may be used to refer to either an IAB-node or an IAB-donor.

In the current CU-DU split architecture of NR Release-15, the admission control is performed in the DU. For an IAB network, this admission control scheme has been extended to work in a multi-hop deployment as follows. After receiving a flow QoS request from the core network, the IAB-donor CU may inform the corresponding access IAB-node DU and some or all intermediate IAB-node DUs about the flow and its QoS requirement. The inquired DUs may accept/reject the requests depending on availability of enough resources. This admission control scheme will incur a high messaging overhead. Moreover, if the admission control rejects due to non-availability of resources, the network may need to determine an alternate route and repeat the same. If there are multiple hops from the CU to the access DU, the admission control will incur a large latency. This latency may be intolerable during the handoff of the flow to a new route when the UE attaches to a new IAB node due to mobility or radio link blockage, or when the IAB network topology need to be reconfigured due to a BH link failure. One or more of the example embodiments described and/or claimed herein may address one or more of the problem(s) indicated above, and may reduce the messaging overheads and/or latencies typically experienced during admission control procedure in an IAB network.

Figure 4:
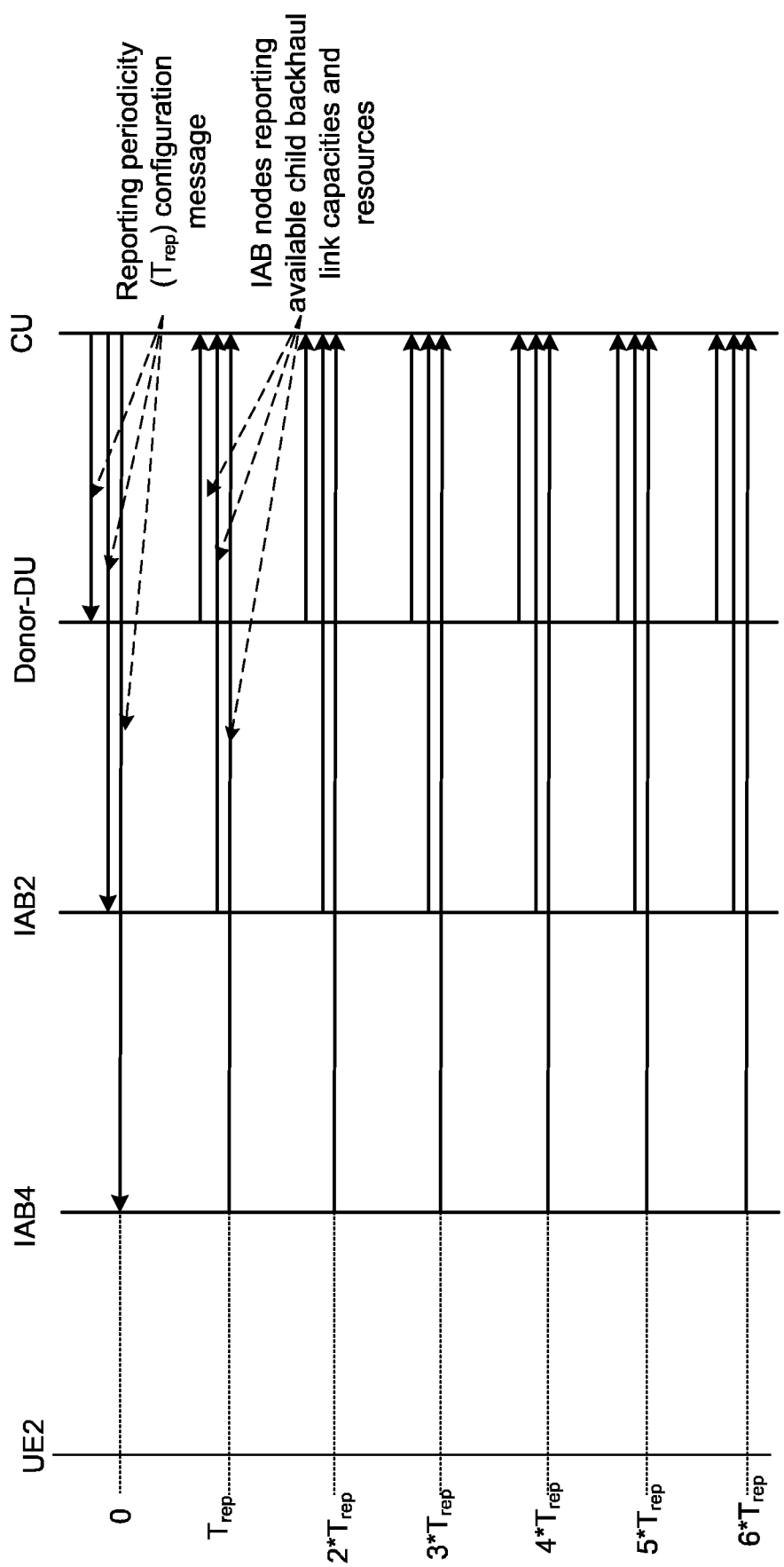
FIG. 4 is a diagram illustrating IAB nodes reporting link capacity (e.g., child backhaul link capacity, or other link capacity) according to an indicated period or periodicity.

FIG. 4 is a diagram illustrating IAB nodes reporting link capacity (e.g., child backhaul link capacity, or other link capacity) according to an indicated period or periodicity. In this example, in response to a request from the CU, the DU performs its load measurement and updates the load status to CU. As shown in FIG. 4, initially, the CU sends a reporting periodicity configuration message containing the reporting interval, $T_{rep}$, to each IAB nodes in the network. After that, each IAB node reports the capacities of its child backhaul link and its available time-frequency resources periodically every $T_{rep}$ time interval. However, the capacity information available at the CU from these periodic reports may not be up-to-date. Hence admission control decisions based on these reports at the CU may be incorrect. Additionally, if the capacity variation at the DU is infrequent, the messaging overheads of periodic reporting can be unnecessarily high.

Figure 5:
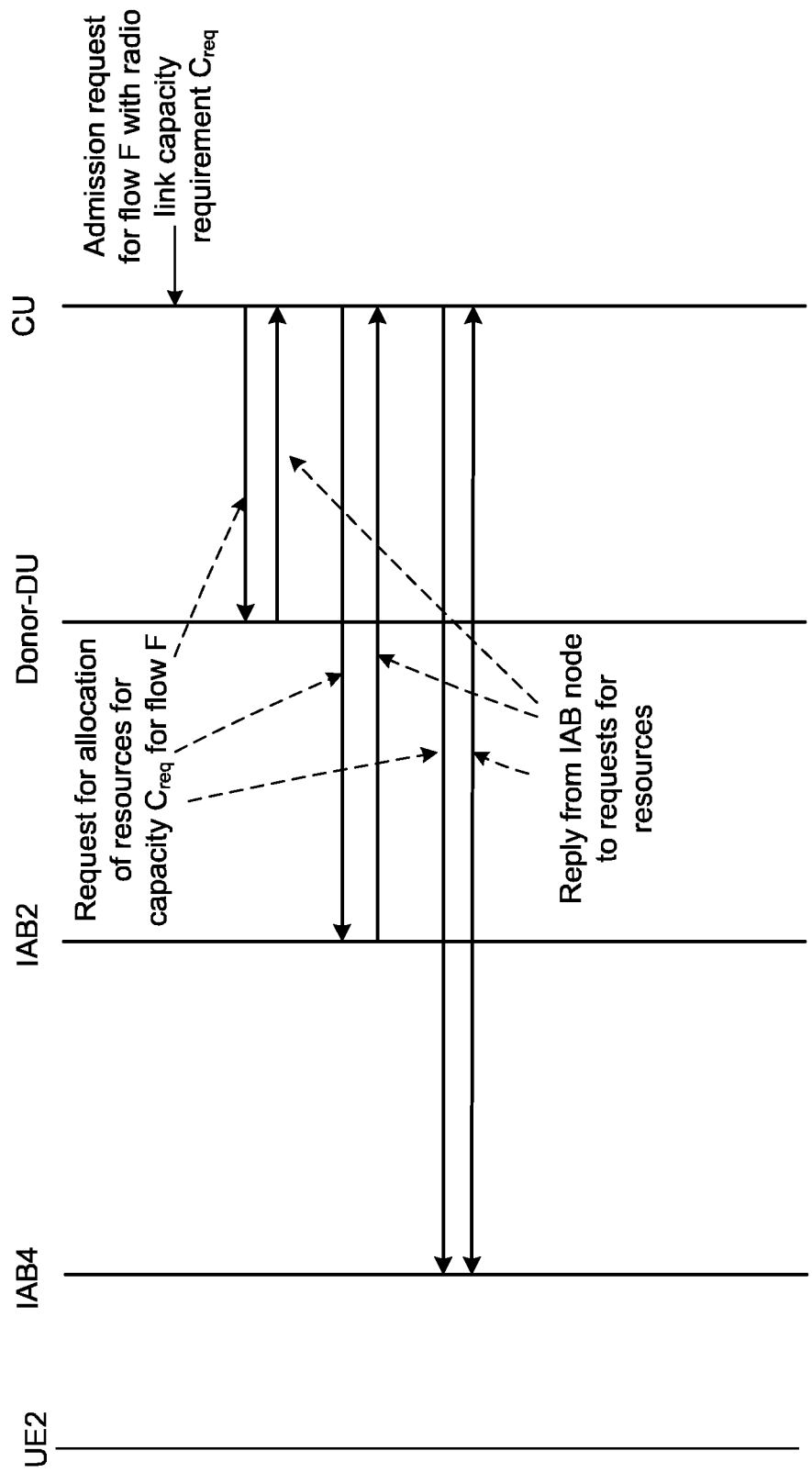
FIG. 5 is a flow chart where IAB nodes along a multi-hop path respond to a request for allocation of resources.

FIG. 5 is a flow chart where IAB nodes along a multi-hop path respond to a request for allocation of resources. An example admission control procedure for an IAB network in shown in FIG. 5. When the request for admission of the flow F for UE2 arrives with a link capacity requirement of $C_{req}$, the CU sends a request for allocation of the required resources to the DUs of the Donor, IAB2 and IAB4. On receiving the request, the DU of Donor, IAB2 and IAB4 checks for availability of time-frequency resources for the required link capacity $C_{req.}$ over the links (Donor,IAB2), (IAB2,IAB4) and (IAB4,UE2), respectively. If available, the DU sends and 'Accept' message to the CU, otherwise sends a 'Reject' message. The CU admits the flow only if it receives 'Accept' messages from each of the IAB nodes. Alternatively, the CU may send a request for load status report for the links (Donor,IAB2), (IAB2,IAB4) and (IAB4, UE2) to the DUs of the Donor, IAB2 and IAB4, respectively. After receiving those reports, the CU may take the admission control decision based on the availability of resources on those links.

Thus, the examples shown in FIG. 4 (periodic link capacity reporting according to an indicated period or periodicity) and FIG. 5 (e.g., which may include link capacity reporting/response on demand) may cause incorrect admission decision or may cause significant latency before an admission control decision may be made (while waiting for link capacity replies) and/or may create significant messaging overhead.

In an example embodiment, IAB nodes may report a link capacity. Link capacity (or capacity of a link) may, for example, include or may refer to (or be measured by) available maximum data rate, which may depend on both an amount of time-frequency resources and a modulation and coding scheme (modulation scheme and coding rate) (MCS). The MCS that is used for a link, e.g., based on link adaptation, may depend on the link quality, e.g., the signal to interference plus noise ratio (SINR) of the link. In an example embodiment, at least in some cases, MCS of backhaul links may be static (not changing or changing slowly or very little, since locations of IABs are fixed). On the other hand, because UEs may be moving and/or changing locations, the MCS applied for communication from a IAB node or DU to a served UE may vary, based on the distance between the IAB node or DU and the UE. Thus, the link capacity of an access link may vary over time. For example, as a UE moves further away from the IAB node or DU, more time-frequency resources may need to be allocated to the UE to provide the same level of service to the UE, which means the available (unoccupied) link capacity of the access link would decrease.

Various example embodiments may be directed to or related to: 1) configuring IAB nodes with threshold parameters (e.g., link capacity threshold information) that may be used by the IAB node to determine when an updated link capacity report should be sent, and 2) techniques for performing admission control for a flow based on these updated link capacity report(s).

Some example embodiments may directed to techniques for configuring IAB nodes with link capacity threshold information, which may be used by the IAB node to determine when and/or under what circumstances, to send or transmit an updated link capacity report. According to an example embodiment, from a perspective of a node (e.g., CU or other control entity) that may perform admission control or that may receive link capacity reports, a method may include: transmitting, to at least one integrated access backhauling (IAB) (e.g., relay) node within a wireless network, link capacity threshold information, wherein the at least one IAB node is requested to perform threshold-based reporting of updated link capacity based on the link capacity threshold information; and receiving, from a first IAB node of the at least one IAB node, an updated link capacity report that was triggered at the IAB node based on a change of available link capacity of the IAB node with respect to the capacity threshold information, the updated link capacity report indicating updated available link capacity of at least one a child backhaul link or at least one access link of the first IAB node.

Also, according to another example embodiment, from a perspective of an IAB node, a method may include receiving, by an integrated access backhauling (IAB) node within a wireless network, link capacity threshold information, wherein the IAB node is requested to perform threshold-based reporting of updated link capacity based on the link capacity threshold information; and transmitting, by the IAB node, an updated link capacity report that was triggered at the IAB node based on a change of available link capacity of the IAB node with respect to the capacity threshold information, the updated link capacity report indicating updated available link capacity of at least one a child backhaul link or at least one access link of the IAB node.

Also, various example embodiments may be directed to performing admission control. Thus, in an example embodiment, from the perspective of a CU, a donor gNB, or other control entity or other entity that may perform admission control for a flow, a method of performing admission control for a flow may include: determining a link capacity threshold value; receiving a link capacity report indicating an available link capacity of at least one a child backhaul link or at least one access link of an integrated access backhauling (IAB) node within a wireless network; receiving an admission request for a flow, including receiving a capacity requirement for the flow; determining that the flow is admissible if the capacity requirement of the flow is less than or equal to the available link capacity of the IAB node minus the link capacity threshold value (e.g., without sending a request for an updated link capacity report from the IAB node); and determining that the flow is not admissible if the capacity requirement of the flow is greater than or equal to the available link capacity of the IAB node plus the link capacity threshold value (e.g., without sending a request for an updated link capacity report from the IAB node).

Various example embodiments may be based on reporting of the resource availability by an IAB-node to its CU. The CU sets a capacity threshold value $C_{th}$ and communicates it to the IAB node DUs. Whenever the available capacity of a child backhaul radio link of an IAB-node changes by $C_{th}$, it reports the new available capacity of the link to its IAB-donor CU. For example, if the last reported available capacity of a child backhaul link of an IAB node is $C_{last}$, then a new report is sent when the available capacity of the link $C<=C_{last}-C_{th}$ or $C>=C_{last}+C_{th}$. If so, then DU/IAB sends an updated link capacity report for that BH link, triggering of updated link capacity report for a IAB child BH link. The threshold $C_{th}$ may be configured by the CU and communicated to each IAB-node. The value of $C_{th}$ can be determined based on the traffic characteristics of the service flows being served by the network.

1) Flow admission control may be performed by donor IAB node, CU or other control entity: Admission control may be performed based on link capacity information. For example, the CU may perform the admission control test for a new or handover flow requiring a capacity of $C_{req}$ (required link capacity of the flow) over a child backhaul link of an IAB node whose last reported available capacity was $C_{last}$ as follows:
  1. If $C_{req}<=C_{last}-C_{th}$, the flow is admissible at the IAB node
  2. If $C_{req}>=C_{last}+C_{th}$, the flow is not admissible 3. If $C_{last}-C_{th}<C_{req}<C_{last}+C_{th}$, perform an explicit admission control for the backhaul link by sending a request for the link capacity $C_{req}$ to the IAB-node.

Updated link capacity reports may be transmitted based on the rules for triggering transmission of the updated link capacity report. For example, an updated link capacity report may be sent when link capacity changes by more than the threshold capacity), that the current link capacity for the IAB child backhaul (BH) link is within the $C_{last}+/-C_{threshold}$). This assumes the DUs of the IAB nodes will follow these rules, and will send updated Link capacities accordingly. Based on these triggering rules, donor IAB node can make some assumptions and perform access control. This approach may provide, e.g., a trade off of performance—keeping current info (information) at donor IAB node of link capacity, vs. minimizing messaging overhead. This approach may also provide a benefit of reduced latency, since donor IAB node can make admission control without first receiving updated link capacity from the other IAB node.

Thus, 3 cases are indicated above: 1) if $C_{req}$ is less than the minimum link capacity (based on the above assumptions) capacity of the child BH link, then flow is admitted. 2) If $C_{req}$ is greater than the maximum link capacity (based on the above assumptions), then flow is not admitted. And, 3) If the $C_{req}$ is between the minimum and the maximum link capacities, then IAB donor node requests and receives an update link capacity, and then perform admission control (based on that updated link capacity).

Some example aspects may include: A) Configuring thresholds, and possibly receiving reports (but reports might be received by an entity that does not perform configuring: CU (or other control entity, e.g., in cloud or in CN) of donor IAB node configures DUs of donor IAB (often CU and DU of donor IAB node are co-located) and non-donor IAB nodes are configured with threshold information (and implicitly instructions on the triggering of updated capacity reports): CU (since these threshold parameters do not change, or change slowly) of IAB donor node configures the IAB nodes of the path for UE with threshold parameters ($C_{th}$ for child BH link, $R_{th}$ for access link), and included within that configuration would be that when last report capacity changes by the $C_{th}$, or $R_{th}$, then send updated capacity report to IAB donor node. Threshold values may also be sent to non-donor IAB nodes and/or to the DU of the IAB donor node. Send the $C_{th}$ to IAB node if non-donor IAB node includes a child BH link, and send $R_{th}$ to all IAB nodes (since all IAB nodes typically includes access links to serve UEs, and may include one or more child BH links). UEs may be configured (with threshold parameters) by CU, or configured by OAM module of network. 2B) DUs of the IAB nodes receive the threshold configurations, and then would detect the condition, and then send a report when a condition is met (based on threshold information). C) Admission control may be performed at CU (or performed at other central entity or control entity, e.g., in cloud) of donor IAB node, based on the required capacity of the flow ($C_{req}$), thresholds, and the last capacity reports from IAB node DUs. Admission control may be performed by entity that collects the updated link capacity reports. Also, one or more absolute threshold values (which may be fixed), where the IAB nodes detect when their link capacity crosses one of these absolute threshold values. DUs of IABs send an updated link capacity report when their link capacity crosses one of these absolute capacity thresholds. This is different, e.g., because these absolute threshold values are fixed, just detect when link capacity crosses one of these absolute capacity thresholds, but in previous case it was triggered only when link capacity changed by that threshold amount.

In another variant of the invention, the CU sets N, N>=1, absolute capacity threshold values $C^i_{abs\_th}$, $0<=i<N$, and communicates them to the IAB node DUs. Whenever the available capacity of a child backhaul radio link of an IAB-node crosses a threshold value $C^i_{abs\_th}$, $0<=i<N$, (i.e. increases from below a threshold values to above that threshold value, or decreases from above a threshold value to below that threshold value), it reports the new available capacity of the link to its IAB-donor CU.

Reporting (link capacity reporting) can be reduced (or maybe even minimized) by setting a hysteresis either in time or capacity domain Time domain: The CU configures a prohibit timer defining how long IAB node shall wait before next report can be sent. This would eliminate unnecessary reporting when the available capacity is close to the configured threshold Capacity domain: A capacity hysteresis value $C_{hyst}$ is configured. A new report is sent after the previous report if:
Previous report was "below $C^i_{abs\_th}$ and the available capacity is $>C^i_{abs\_th}+C_{hyst}$
Previous report was "above $C^i_{abs\_th}$ and the available capacity is $<C^i_{abs\_th}-C_{hyst}$ In this case the admission control test for a new or handover flow requiring a capacity of $C_{req}$ over a child backhaul link of an IAB node whose last reported available capacity was $C_{last}$ as follows:
1. If $C_{last}>=C^i_{abs\_th}$ and $C_{req}<=C^i_{abs\_th}-C_{hyst}$ for some $0<=i<N$, the flow is admissible at the IAB node
2. If $C_{last}<C^i_{abs\_th}$, and $C_{req}>=C^i_{abs\_th}+C_{hyst}$ for some $0<=i<N$, the flow is not admissible
3. If $C^i_{abs\_th}<C_{last}<C^{i+1}_{abs\_th}$ and $C^i_{abs\_th}-C_{hyst}<C_{req}<C^{i+1}_{abs\_th}+C_{hyst}$, perform an explicit admission control for the backhaul link by sending a request for the link capacity $C_{req}$ to the IAB-node.

A service flow for a UE is admissible along a route, if it is admissible over each backhaul link along the route and the access link to the UE at the serving IAB-node. If a service flow is not admissible along a route, the network may determine an alternate route and perform the admission control again. Some example features or aspects may include:

An IAB node sends a link capacity update report to the CU only when it changes by a threshold configured by the network. This may avoid some of the disadvantages of sending updated resource availability reports being sent periodically. The periodic reporting scheme may not reflect the up-to-date resource availability status and its messaging overhead can be significantly higher, especially in a scenario where significant changes in available resources (e.g., link capacity) are infrequent.

Since the CU will have up-to-date information about the available capacity of the backhaul links at each IAB-node in the network, CU may be able to decide the admissibility of a service flow at an IAB-node without sending any messages to the IAB nodes. This may reduce the messaging overhead and admission control latency compared to the schemes where no resource availability reports are sent or they are sent periodically.

Some of the example embodiments may include one or more functional components, such as, for example:
1. Reporting threshold configuration
2. Trigger-based reporting The IAB-nodes are first configured with the threshold value, $C_{th}$, for triggering the reports of backhaul link capacity. In response to this configuration, the IAB-nodes send the initial reports to the CU. In the initial report, an IAB node sends the available capacity of each of its child backhaul link. After the initial report, an IAB node sends a report for a child backhaul link only when its capacity increases or decreases from the last reported value by the capacity threshold. Since the IAB radio resource is shared among all child backhaul and the access links, the available capacity $C_l$ of a child backhaul link l is computed as:

$C_l = R_{av} * MCS_l$ where, $R_{av}$=the available time-frequency resources at the IAB node DU; and $MCS_l$=the MCS supported by the child BH link l.

For the access link of a UE, capacity information is used during the admission control of a service flow for the UE. Therefore, access link capacity can be reported to the CU during the service flow setup or RRC Connection reconfiguration. Alternatively, the IAB-node may report the available time-frequency resource, $R_{av}$, to the CU. During the configuration of the reporting, the CU may send a threshold value for available resources, $R_{th}$, to the IAB nodes; in response each IAB node sends its available resources to the CU. Subsequently, an IAB node reports its available time-frequency resources whenever it changes by the threshold, $R_{th}$. During the service flow setup, the CU may acquire the sustainable MCS for the UE's access link and estimate the available capacity based on the last reported $R_{av}$.

Figure 6:
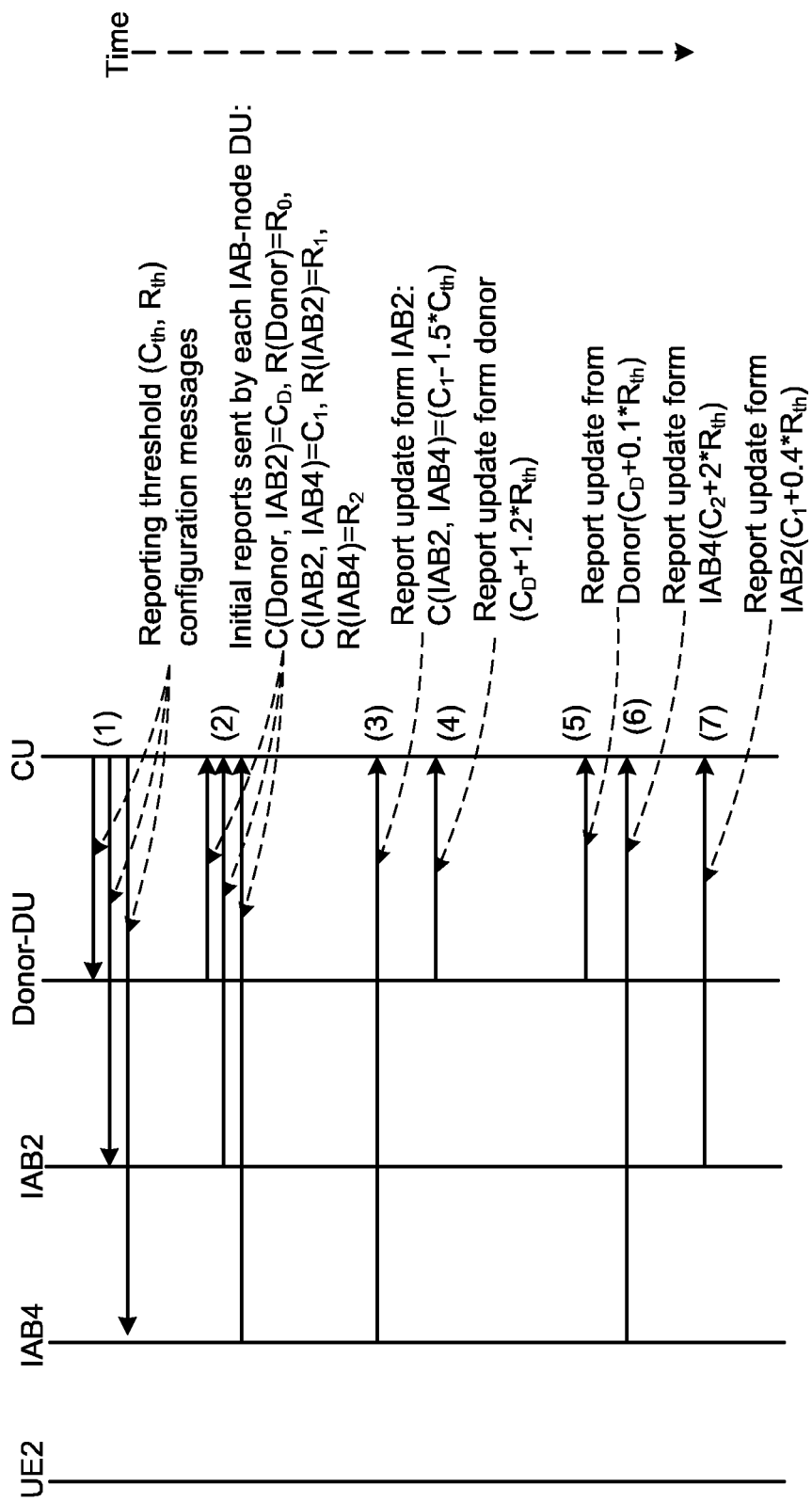
FIG. 6 is a diagram illustrating configuration of IAB nodes, e.g., with link capacity threshold information according to an example embodiment.

FIG. 6 is a diagram illustrating configuration of IAB nodes, e.g., with link capacity threshold information (e.g., such as with a link capacity threshold value, and/or one or more absolute capacity threshold values) according to an example embodiment. The configuration and reporting are illustrated in FIG. 6 for the route to a UE as shown in the example topology in FIG. 3, for example. The capacity of a link (I, J) is denoted by C(I,J) and the available resources at an IAB node I is denoted by R(I). The messages are as follows:

(1) The CU sends the configuration messages containing the threshold values $C_{th}$ and $R_{th}$ to all IAB nodes including the Donor, IAB2 and IAB4.

(2) Each IAB nodes responds with initial reports of the available capacity for each child backhaul link and its available time-frequency resources. The reports from the IAB nodes are:
Donor: C(Donor, IAB2)=$C_0$, R(Donor)=$R_0$.
IAB2: C(IAB2, IAB4)=$C_1$, R(IAB2)=$R_1$.
IAB4: R(IAB4)=$R_2$.

(3) Capacity of link (IAB2, IAB4) decreases by $1.5*C_{th}$; hence IAB2 reports the new available link capacity C(IAB2, IAB4)=($C_1 - 1.5 C_{th}$).

(4) Capacity of the link (Donor, IAB2) increases by $1.2*C_{th}$ and the available resources at Donor increases by $1.2*R_{th}$. Hence, the Donor reports C(Donor, IAB2)=($C_0 + 1.2*C_{th}$) and R(Donor)=($R_0 + 1.2*R_{th}$).

(5) Capacity of the link (Donor,IAB2) decreases by $1.1*C_{th}$ and the Donor reports C(Donor,IAB2)=($C_0 + 1.1*C_{th}$) to CU.

(6) Available resources at IAB4 increases by $2*R_{th}$; IAB4 reports R(IAB4)=($R_2 + 2*R_{th}$) to CU.

(7) Capacity of link (IAB2,IAB4) increases by $1.9*C_{th}$; hence IAB2 reports C(IAB2,IAB4)=($C_1 + 0.4*C_{th}$).

In an alternative embodiment, when an IAB node sends a report of the capacity of a child backhaul link triggered by a change of the capacity of the link by $C_{th}$ (or sends a report of its available resources triggered by a change of the available resource by $R_{th}$), it may include also the capacities of the other child backhaul links and its available resources in the report; this piggybacking of the other reports helps to maintain more up-to-date status information at the CU.

The reporting threshold parameters $C_{th}$ and $R_th$ may be sent to the DU of an IAB node over the F1-AP interface. The available child backhaul link capacities and the time-frequency resources of a IAB node DU may also be sent over the F1-AP interface to the CU.

Figure 7:
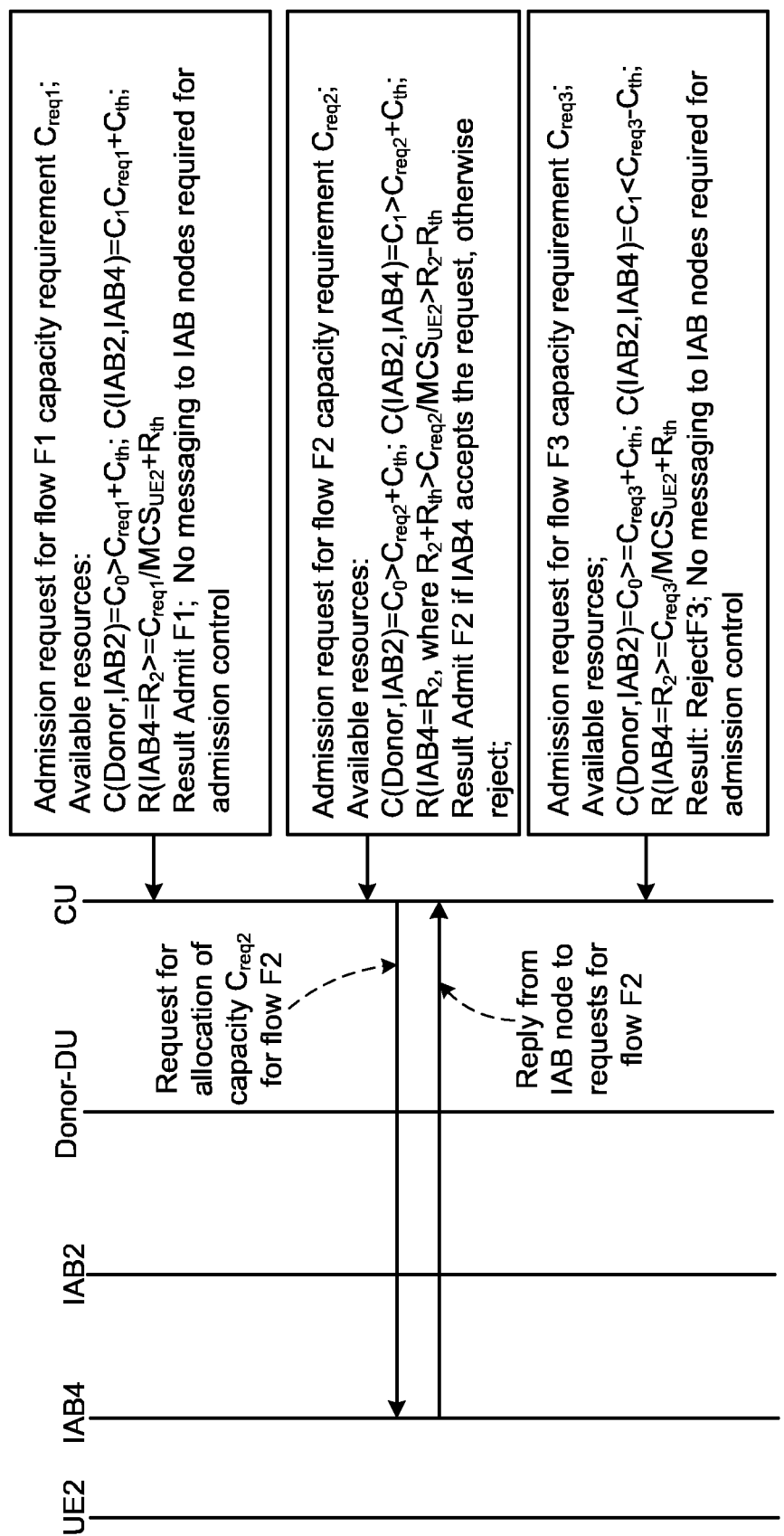
FIG. 7 is a diagram illustrating a method of admission control that may be performed based on updated link capacity reports received from IAB nodes according to an example embodiment.

FIG. 7 is a diagram illustrating a method of admission control that may be performed based on updated link capacity reports received from IAB nodes according to an example embodiment. Based on the above example, admission control operation for three flows of the UE, F1, F2 and F3, are illustrated in FIG. 7. Without loss of generality, let assume that, just before the admission control for each of the flows F1, F2 and F3, the available capacities of the backhaul links, based on the last received reports, are: C(Donor, IAB2)=$C_0$, C(IAB2,IAB4)=$C_1$; the available resource at IAB4 is: R(IAB4)=$R_2$ and the sustainable MCS of UE2 at IAB4 is $MCS_{UE2}$.

For flow F1, the required link capacity is $C_{req1}$. It is found that:

$C_0 >= C_{req1} + C_{th}$, and $C_1 >= C_{req1} + C_{th}$, and $R_2 >= C_{req1}/MCS_{UE2} + R_{th}$ Thus, flow F1 is admissible and no messaging to the IAB nodes are required for admission control.

For Flow F2, the required link capacity is $C_{req2}$. It is found that:

$C_0 >= C_{req2} + C_{th}$, and $C_1 >= C_{req2} + C_{th}$, and $R_2 + R_{th} > C_{req2}/MCS_{UE2} > R_2 - R_{th}$ Although, F2 is admissible over the backhaul links (Donor,IAB2) and (IAB2,IAB4), an explicit admission control test is required for the access link at IAB4. Thus, the CU sends an admission control request to IAB4.

For flow F3, the required link capacity is $C_{req3}$. It is found that:

$C_0 >= C_{req3} + C_{th}$, and $C_1 < C_{req3} - C_{th}$, and $R_2 >= C_{req3}/MCS_{UE2} + R_{th}$ The available capacity of backhaul link (IAB2, IAB4) is not sufficient for the flow F3. Thus, the admission control rejects the flow. No messaging is required for admission control tests.

The F1-AP interface between the CU and an IAB-node DU can be used for sending the admission request and response messages. The admission request contains the resource requirement for the flow. The resource requirement can be described by, e.g.:

1. Link capacity or Data rate
2. Delay
3. Delay jitter

In order to understand the benefits of the example embodiments, the load reporting scheme for admission control and the corresponding admission control procedures are illustrated in FIGS. 6-7, respectively, for the same network and UE flows as in FIG. 3.

If the service flow of a UE is admitted by the admission control along a route, the RLC channels and QoS enforcing parameters need to be configured for the flow at each IAB-node along the route. This configuration can be done after the admission control or jointly with admission control. In either case, the proposed invention provides benefits in terms of messaging overhead reduction and latency reduction as described below, by way of illustrative examples.

Admission control followed by RLC and QoS configuration: If the flow is admissible along the route (i.e. criteria 1 is satisfied for each IAB-node along the route), or the flow is inadmissible at any of the IAB-node (i.e. criteria 2 is satisfied for an IAB-node) no latency or messaging overhead is incurred for admission control test. Otherwise, the latency is the maximum of the round-trip delays from the CU to the IAB-nodes for which the criteria 3 holds, and the messaging overhead is determined by the number of IAB-nodes the criteria 3 need to be tested for admission control. For admission control using the reporting schemes of the prior art, the latency is the round-trip delay to the farthest IAB-node from the CU and the messaging overhead is determined by the number of IAB-nodes in the route.

Joint Admission control and RLC and QoS configuration: In this scheme, the same message is used to perform admission control at an IAB-node DU and, if the flow is admissible at the node, to configure the RLC channel and QoS parameters. If the flow is not admissible (i.e. criteria 2) at any of the IAB-node along the route, CU can reject the flow without incurring any latency or messaging overhead and test alternate routes. Otherwise, the flow is either admissible at all IAB-nodes along the route (i.e. criteria 1) or the flow needs to be tested for admission control at least at one of the IAB-nodes (i.e. criteria 3); in either case, latency minimization requires that the CU send RLC and QoS configuration to the IAB-nodes at which the flow has passed admission control test and also send the joint admission control and RLC and QoS configuration request to the IAB-nodes satisfying criteria 3. Thus, the latency and messaging overhead is same as it would be with the reporting schemes in the prior art.

In certain scenarios, when a backhaul link fails, multiple affected flows may be rerouted along paths which may overlap partially or even completely along their routes from the CU to their corresponding UEs. In such cases, the embodiments of the proposed invention may significantly reduce the latency and message overheads for admission control decisions at the common DUs of those multiple flows' routes.

Example embodiments may include, or may be directed to one or more of the following, for example:

1. The Central Unit (CU) of the IAB-donor in an IAB network sends to the DUs of the IAB-donors and the IAB-nodes in its subtending IAB network a message containing the threshold values, $C_{th}$, for sending reports on available capacities of the child backhaul links and $R_{th}$, the available time-frequency resources.
2. On receiving the configuration message from the CU, a DU sends the initial report of the available capacity for each of its child backhaul link and its available time-frequency resources.
3. Subsequently to sending the initial reports a DU does the following:
    a. When the available capacity of a child backhaul link increases or decreases from the last reported value by at least the threshold $C_{th}$, the DU sends a new report of the available capacity of that child backhaul link to the CU.
    b. When the available time-frequency resources the DU increases or decreases from the last reported value by at least the threshold $R_{th}$, the DU sends a new report of the available time-frequency resources of DU to the CU.
4. On receiving a request for admission of a UE flow with capacity requirement $C_{req}$ along a route the CU does the following:
    a. For each backhaul link along the route perform the admission control test to determine if the flow is admissible or not. If the admission is rejected for any link, then deny admission to the flow.
    b. For the access link, determine resource requirement for the flow as $R_{req}=C_{req}/MCS_{UE}$, where $MCS_{UE}$ is the sustainable MCS for the UE.
        i. If $R_{req}<R_{av}-R_{th}$, where $R_{av}$=available resources at the access IAB node DU, admit the flow.
        ii. If $R_{req}>R_{av}+R_{th}$, deny admission to it.
        iii. Otherwise, send a request to the access IAB node for a resource of $R_{req}$; if granted, admit the flow, else deny admission.

CU: Central Unit
C-RNTI: Cell Radio Network Temporary Identifier
DgNB: Donor gNB
DL: Downlink
DU: Distributed Unit
F1-AP: F1 Application Protocol
IAB: Integrated Access and Backhaul
IAB MT (IAB node MT): MT function in an IAB-node
IAB DU (IAB node DU): DU function in a IAB node
MCS: Modulation and Coding Scheme
NR: 3GPP New Radio
QoS: Quality of Service
RLC: Radio Link Control
RLF: Radio Link failure
RRC: Radio Resource Control
RRM: Radio Resource Management
TM: Topology Manager
UE: User Equipment
UL: Uplink Some illustrative examples will now be described.

Example 1. An apparatus comprising: at least one processor; and at least one memory including computer program code; the at least one memory and the computer program code configured to, with the at least one processor, cause the apparatus at least to: transmit, to at least one integrated access backhauling (IAB) node within a wireless network, link capacity threshold information, wherein the at least one IAB node is requested to perform threshold-based reporting of updated link capacity based on the link capacity threshold information; and receive, from a first IAB node of the at least one IAB node, an updated link capacity report that was triggered at the IAB node based on a change of available link capacity of the IAB node with respect to the capacity threshold information, the updated link capacity report indicating updated available link capacity of at least one a child backhaul link or at least one access link of the first IAB node.

Example 2. The apparatus of example 1, wherein being configured to cause the apparatus to transmit comprises being configured to cause the apparatus to transmit, to at least one integrated access backhauling (IAB) node within the wireless network, a link capacity threshold value, wherein the at least one IAB node is requested to perform threshold-based reporting of updated link capacity if an available link capacity of a child backhaul link or an access link of the at least one IAB node changes by more than the link capacity threshold value.

Example 3. The apparatus of any of examples 1-2, wherein: the at least one IAB node is requested to perform threshold-based reporting of updated link capacity if an available link capacity of a child backhaul link or an access link of the at least one IAB node, as compared to a last reported available link capacity, changes by more than the link capacity threshold value.

Example 4. The apparatus of any of examples 1-3, wherein being configured to cause the apparatus to transmit comprises being configured to cause the apparatus to transmit, to at least one integrated access backhauling (IAB) node within the wireless network, at least one absolute capacity threshold value, wherein the at least one IAB node is requested to perform threshold-based reporting of updated link capacity if an available link capacity of a child backhaul link or an access link of the at least one IAB node crosses (e.g., changes or transitions from being less than to greater than, or from being greater than to less than) at least one of the at least one absolute capacity threshold value.

Example 5. The apparatus of any of examples 1-4, further comprising being configured to cause the apparatus to: receive, from the first IAB node of the at least one IAB node, an initial link capacity report indicating an initial link capacity of at least one of a child backhaul link or an access link of the first IAB node; and wherein being configured to cause the apparatus to receive the updated link capacity report comprises being configured to cause the apparatus to receive, from a first IAB node of the at least one IAB node, an updated link capacity report indicating updated available link capacity of the child backhaul link or the access link of the first IAB node, wherein the updated link capacity report was triggered at the first IAB node based on at least one of: 1) an available link capacity of the child backhaul link or the access link of the first IAB node, as compared to a last reported available link capacity, changes by more than a link capacity threshold value; or 2) an available link capacity of the child backhaul link or the access link of the first IAB node crosses at least one absolute capacity threshold value.

Example 6. The apparatus of any of examples 1-5, further comprising being configured to cause the apparatus to: transmit, to at least one integrated access backhauling (IAB) node within a wireless network, a resource threshold value, wherein the at least one IAB node is requested to perform threshold-based reporting of updated resource availability of a child backhaul link or access link if the available resources of the child backhaul link or access link of the at least one IAB node changes by more than the resource threshold value; and receive, from a first IAB node of the at least one IAB node, an updated available resource report indicating updated available resources of the child backhaul link or the access link of the first IAB node, where the updated available resource report is triggered at the first IAB node based on the available resources of the child backhaul link or the access link of the first IAB node changing by more than the resource threshold value.

Example 7. An apparatus comprising: at least one processor; and at least one memory including computer program code; the at least one memory and the computer program code configured to, with the at least one processor, cause the apparatus at least to: receive, by an integrated access backhauling (IAB) node within a wireless network, link capacity threshold information, wherein the IAB node is requested to perform threshold-based reporting of updated link capacity based on the link capacity threshold information; and transmit, by the IAB node, an updated link capacity report that was triggered at the IAB node based on a change of available link capacity of the IAB node with respect to the capacity threshold information, the updated link capacity report indicating updated available link capacity of at least one a child backhaul link or at least one access link of the IAB node.

Example 8. The apparatus of example 7, wherein being configured to cause the apparatus to receive comprises being configured to cause the apparatus to receive, by the IAB node within the wireless network, a link capacity threshold value, wherein the IAB node is requested to perform threshold-based reporting of updated link capacity if an available link capacity of a child backhaul link or an access link of the IAB node changes (e.g., either increases or decreases) by more than the link capacity threshold value.

Example 9. The apparatus of any of examples 7-8, wherein being configured to cause the apparatus to transmit comprises being configured to cause the apparatus to transmit, by the IAB node, an updated link capacity report if an available link capacity of a child backhaul link or an access link of the at least one IAB node, as compared to a last reported available link capacity, has changed (e.g., either increased or decreased) by more than the link capacity threshold value.

Example 10. The apparatus of any of examples 7-9, wherein being configured to cause the apparatus to receive comprises being configured to cause the apparatus to receive, by the IAB node within the wireless network, at least one absolute capacity threshold value, wherein the IAB node is requested to perform threshold-based reporting of updated link capacity if an available link capacity of a child backhaul link or an access link of the IAB node crosses (e.g., changes or transitions from being less than to greater than, or from being greater than to less than) at least one of the at least one absolute capacity threshold value.

Example 11. The apparatus of any of examples 7-10, further comprising being configured to cause the apparatus to: transmit, by the IAB node, an initial link capacity report indicating an initial link capacity of at least one of a child backhaul link or an access link of the IAB node; detect, by the IAB node, a change in link capacity based on at least one of the following: 1) an available link capacity of the child backhaul link or the access link of the IAB node, as compared to a last reported available link capacity of a same link, has changed by at least a link capacity threshold value; or 2) an available link capacity of the child backhaul link or the access link of the first IAB node crosses at least one absolute capacity threshold value; and wherein being configured to cause the apparatus to transmit the updated link capacity report comprises being configured to cause the apparatus to transmit, by the IAB node, an updated link capacity report indicating updated available link capacity of at least one of the child backhaul link or the access link of the IAB node in response to the detecting.

Example 12. The apparatus of any of examples 7-11, further comprising being configured to cause the apparatus to: receive, by the IAB node within the wireless network, a resource threshold value, wherein the IAB node is requested to perform threshold-based reporting of updated resource availability of a child backhaul link or access link if available time-frequency resources of the child backhaul link or access link of the IAB node changes by more than the resource threshold value; detect, by the IAB node, that the available time-frequency resources of the child backhaul link or access link of the IAB node has changed, based on a last reported available resources, by more than the resource threshold value, and transmit, by the IAB node in response to the detecting that the available time-frequency resources of the child backhaul link or access link of the IAB node has changed by more than the resource threshold value, an updated available resource report indicating updated available time-frequency resources of the child backhaul link or the access link of the first IAB node.

Example 13. An apparatus comprising: at least one processor; and at least one memory including computer program code; the at least one memory and the computer program code configured to, with the at least one processor, cause the apparatus at least to: determine a link capacity threshold value; receive a link capacity report indicating an available link capacity of at least one a child backhaul link or at least one access link of an integrated access backhauling (IAB) node within a wireless network; receive an admission request for a flow, including receiving a capacity requirement for the flow; compare the capacity requirement for the flow to the available link capacity of the IAB node; determine that the flow is admissible if the capacity requirement of the flow is less than or equal to the available link capacity of the IAB node minus the link capacity threshold value; and determine that the flow is not admissible if the capacity requirement of the flow is greater than or equal to the available link capacity of the IAB node plus the link capacity threshold value.

Example 14. The apparatus of example 13, further comprising being configured to cause the apparatus to: send a request to the IAB node for an updated link capacity report indicating an updated available link capacity of the IAB node, if the capacity requirement of the flow is greater than 1) the available link capacity of the IAB node minus the link capacity threshold value, and less than 2) the available link capacity of the IAB node plus the link capacity threshold value.

Example 15. The apparatus of example 14, further comprising being configured to cause the apparatus to: perform admission control for the flow based on the updated link capacity of the IAB node.

Example 16. An apparatus comprising: at least one processor; and at least one memory including computer program code; the at least one memory and the computer program code configured to, with the at least one processor, cause the apparatus at least to: determine at least one absolute capacity threshold value; receiving a link capacity report indicating an available link capacity of at least one a child backhaul link or at least one access link of an integrated access backhauling (IAB) node within a wireless network; receive an admission request for a flow, including receiving a capacity requirement for the flow; determine that the flow is admissible if both: the capacity requirement of the flow is less than or equal to a first absolute capacity threshold value of the at least one absolute capacity threshold value, and the available link capacity of the at least one child backhaul link or the at least one access link of the IAB node is greater than or equal to the available link capacity of the IAB node; and determine that the flow is not admissible if both: the capacity requirement of the flow is greater than or equal to a first absolute capacity threshold value, and the available link capacity of the at least one child backhaul link or the at least one access link of the IAB node is less than the available link capacity of the IAB node; otherwise, sending a request to the IAB node for an updated link capacity report indicating an updated available link capacity of the at least one child backhaul link or the at least one access link of the IAB.

Example 17. The apparatus of example 16, further comprising being configured to cause the apparatus to: perform admission control for the flow based on the updated link capacity indicating an updated available link capacity of the at least one child backhaul link or the at least one access link of the IAB node.

Figure 8:
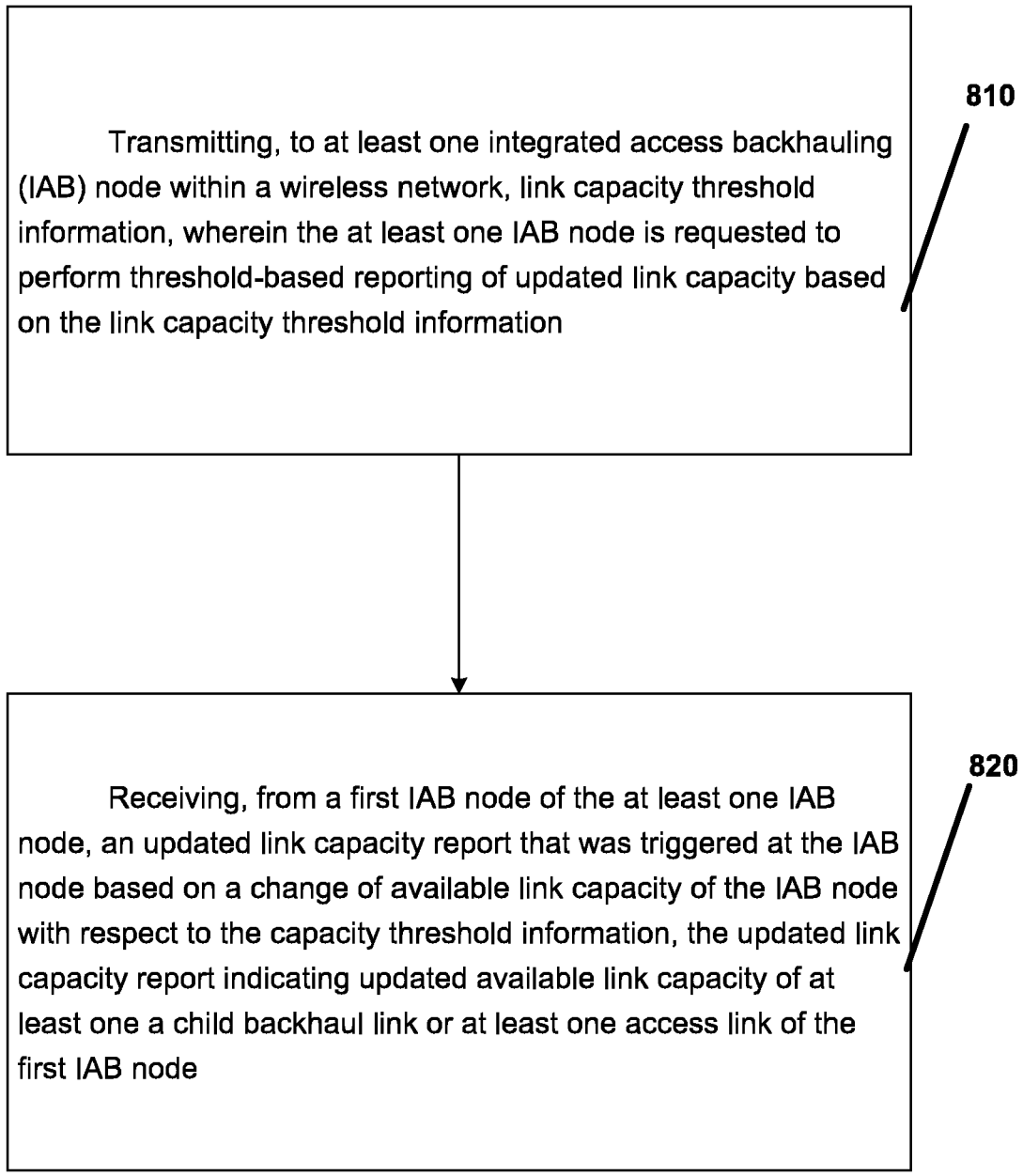
FIG. 8 is a flow chart illustrating operation of a node or device according to an example embodiment.

Example 18. FIG. 8 is a flow chart illustrating operation of a node or device according to an example embodiment. Operation 810 includes transmitting, to at least one integrated access backhauling (IAB) (e.g., relay) node within a wireless network, link capacity threshold information, wherein the at least one IAB node is requested to perform threshold-based reporting of updated link capacity based on the link capacity threshold information. And, operation 820 includes receiving, from a first IAB node of the at least one IAB node, an updated link capacity report that was triggered at the IAB node based on a change of available link capacity of the IAB node with respect to the capacity threshold information, the updated link capacity report indicating updated available link capacity of at least one a child backhaul link or at least one access link of the first IAB node.

Example 19. The method of example 1, wherein: the transmitting comprises transmitting, to at least one integrated access backhauling (IAB) node within the wireless network, a link capacity threshold value, wherein the at least one IAB node is requested to perform threshold-based reporting of updated link capacity if an available link capacity of a child backhaul link or an access link of the at least one IAB node changes by more than the link capacity threshold value.

Example 20. The method of any of examples 18-19, wherein: the at least one IAB node is requested to perform threshold-based reporting of updated link capacity if an available link capacity of a child backhaul link or an access link of the at least one IAB node, as compared to a last reported available link capacity, changes by more than the link capacity threshold value.

Example 21. The method of any of examples 18-20, wherein: the transmitting comprises transmitting, to at least one integrated access backhauling (IAB) node within the wireless network, at least one absolute capacity threshold value, wherein the at least one IAB node is requested to perform threshold-based reporting of updated link capacity if an available link capacity of a child backhaul link or an access link of the at least one IAB node crosses (e.g., changes or transitions from being less than to greater than, or from being greater than to less than) at least one of the at least one absolute capacity threshold value.

Example 22. The method of any of examples 18-22, further comprising: receiving, from the first IAB node of the at least one IAB node, an initial link capacity report indicating an initial link capacity of at least one of a child backhaul link or an access link of the first IAB node; wherein the receiving the updated link capacity report comprises receiving, from a first IAB node of the at least one IAB node, an updated link capacity report indicating updated available link capacity of the child backhaul link or the access link of the first IAB node, wherein the updated link capacity report was triggered at the first IAB node based on at least one of: 1) an available link capacity of the child backhaul link or the access link of the first IAB node, as compared to a last reported available link capacity, changes by more than a link capacity threshold value; or 2) an available link capacity of the child backhaul link or the access link of the first IAB node crosses at least one absolute capacity threshold value.

Example 23. The method of any of examples 17-22, further comprising: transmitting, to at least one integrated access backhauling (IAB) node within a wireless network, a resource threshold value, wherein the at least one IAB node is requested to perform threshold-based reporting of updated resource availability of a child backhaul link or access link if the available resources of the child backhaul link or access link of the at least one IAB node changes by more than the resource threshold value; and receiving, from a first IAB node of the at least one IAB node, an updated available resource report indicating updated available resources of the child backhaul link or the access link of the first IAB node, where the updated available resource report is triggered at the first IAB node based on the available resources of the child backhaul link or the access link of the first IAB node changing by more than the resource threshold value.

Figure 9:
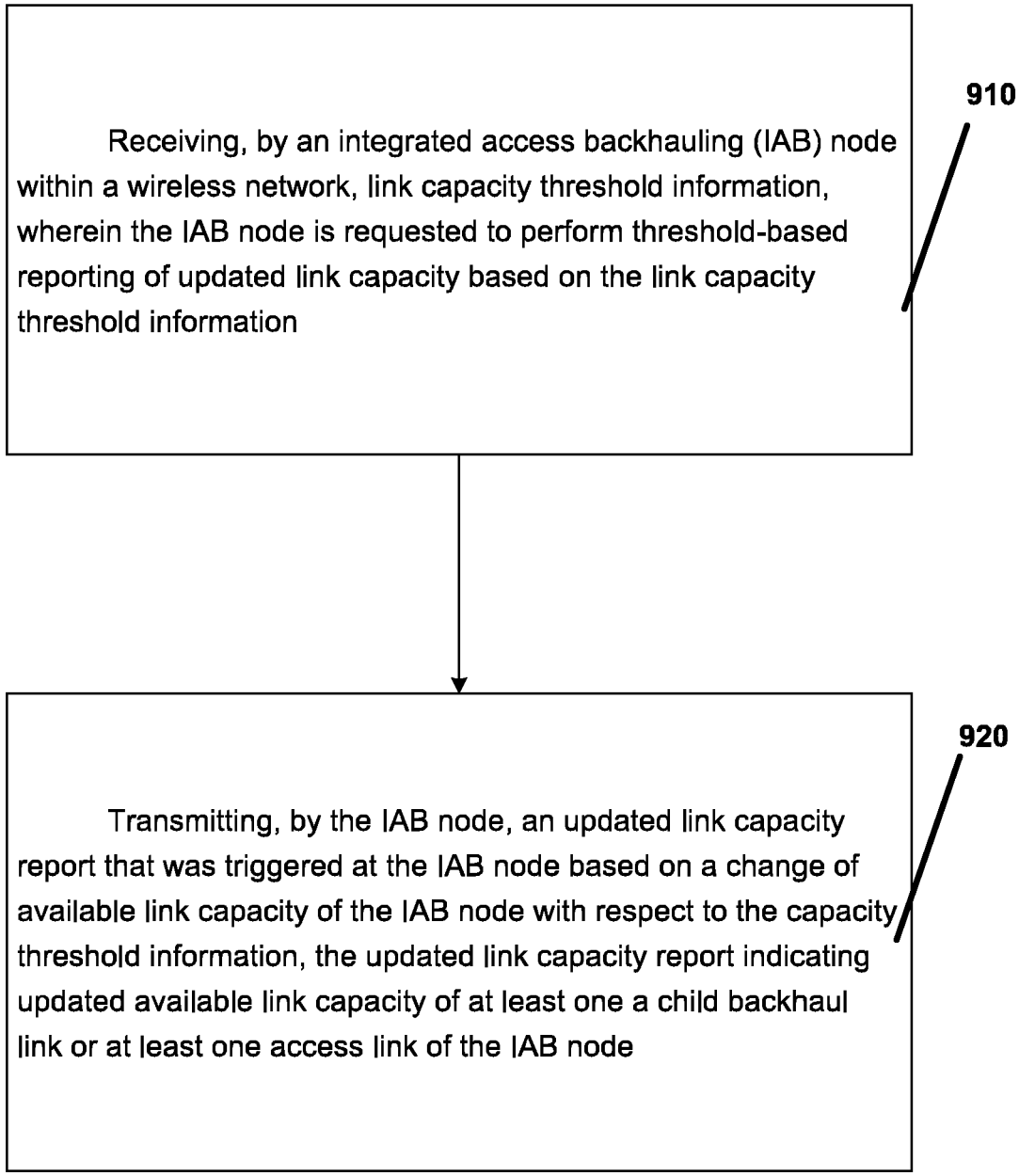
FIG. 9 is a flow chart illustrating operation of an integrated access backhaul (IAB) node according to an example embodiment.

Example 24. FIG. 9 is a flow chart illustrating operation of an integrated access backhaul (IAB) node according to an example embodiment. Operation 910 includes receiving, by an integrated access backhauling (IAB) node within a wireless network, link capacity threshold information, wherein the IAB node is requested to perform threshold-based reporting of updated link capacity based on the link capacity threshold information. Operation 920 includes transmitting, by the IAB node, an updated link capacity report that was triggered at the IAB node based on a change of available link capacity of the IAB node with respect to the capacity threshold information, the updated link capacity report indicating updated available link capacity of at least one a child backhaul link or at least one access link of the IAB node.

Example 25. The method of example 24, wherein: the receiving comprises receiving, by the IAB node within the wireless network, a link capacity threshold value, wherein the IAB node is requested to perform threshold-based reporting of updated link capacity if an available link capacity of a child backhaul link or an access link of the IAB node changes (e.g., either increases or decreases) by more than the link capacity threshold value.

Example 26. The method of any of examples 24-25, wherein: the transmitting comprises transmitting, by the IAB node, an updated link capacity report if an available link capacity of a child backhaul link or an access link of the at least one IAB node, as compared to a last reported available link capacity, has changed (e.g., either increased or decreased) by more than the link capacity threshold value.

Example 27. The method of any of examples 24-26, wherein: the receiving comprises transmitting, by the IAB node within the wireless network, at least one absolute capacity threshold value, wherein the IAB node is requested to perform threshold-based reporting of updated link capacity if an available link capacity of a child backhaul link or an access link of the IAB node crosses (e.g., changes or transitions from being less than to greater than, or from being greater than to less than) at least one of the at least one absolute capacity threshold value.

Example 28. The method of any of examples 24-27, further comprising: transmitting, by the IAB node, an initial link capacity report indicating an initial link capacity of at least one of a child backhaul link or an access link of the IAB node; detecting, by the IAB node, a change in link capacity based on at least one of the following: 1) an available link capacity of the child backhaul link or the access link of the IAB node, as compared to a last reported available link capacity (of same link), has changed by at least a link capacity threshold value; or 2) an available link capacity of the child backhaul link or the access link of the first IAB node crosses (e.g., changes or transitions from being less than to greater than, or changes from being greater than to less than) at least one absolute capacity threshold value; and wherein the transmitting the updated link capacity report comprises transmitting, by the IAB node, an updated link capacity report indicating updated available link capacity of (at least one of) the child backhaul link or the access link of the IAB node in response to the detecting.

Example 29. The method of any of examples 24-28, further comprising: receiving, by the IAB node within the wireless network, a resource threshold value, wherein the IAB node is requested to perform threshold-based reporting of updated resource availability of a child backhaul link or access link if available time-frequency resources of the child backhaul link or access link of the IAB node changes by more than the resource threshold value; detecting, by the IAB node, that the available time-frequency resources of the child backhaul link or access link of the IAB node has changed (e.g., either increased or decreased), based on a last reported available resources, by more than the resource threshold value, and transmitting, by the IAB node in response to the detecting that the available time-frequency resources of the child backhaul link or access link of the IAB node has changed by more than the resource threshold value, an updated available resource report indicating updated available time-frequency resources of the child backhaul link or the access link of the first IAB node.

Figure 10:
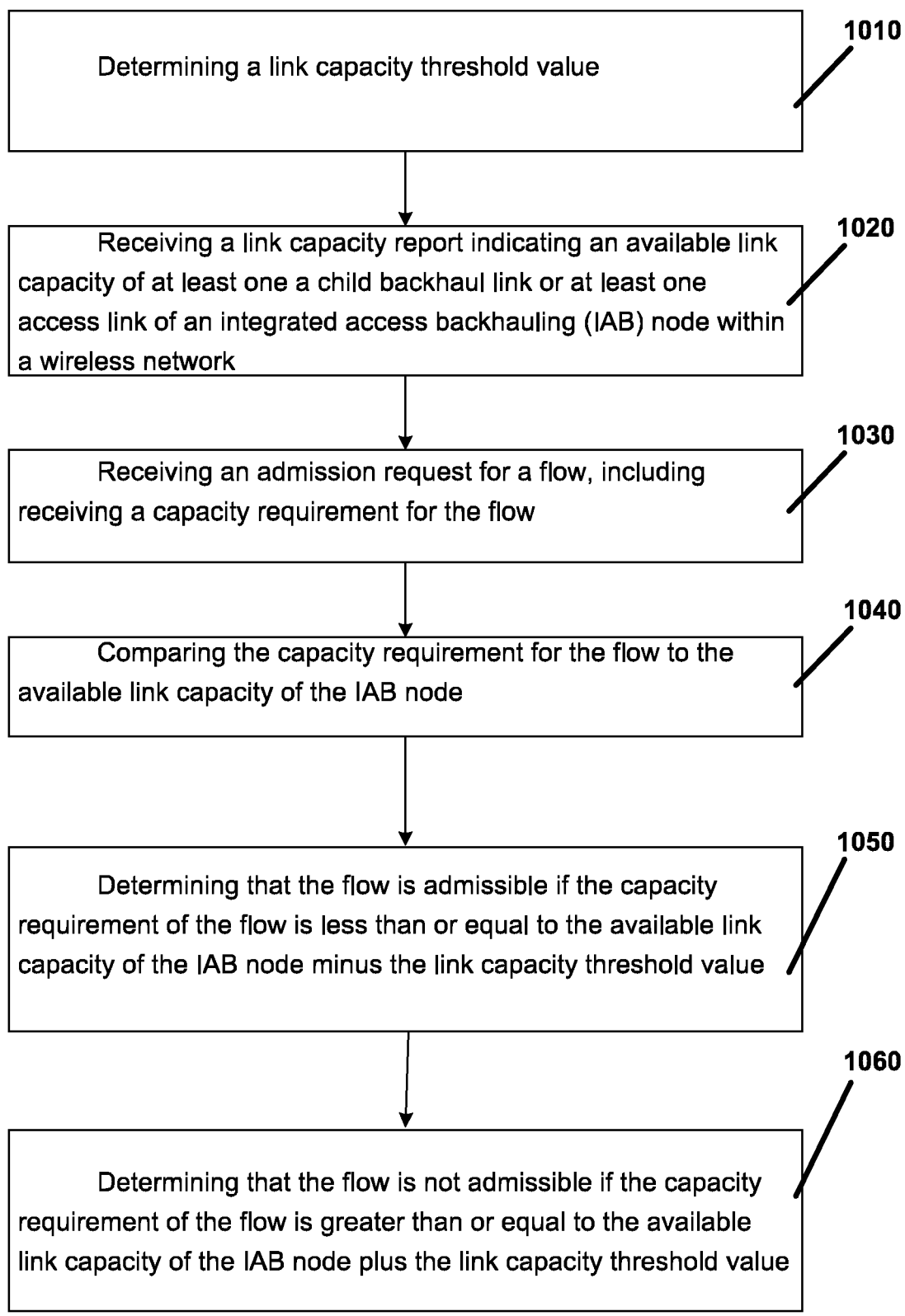
FIG. 10 is a flow chart illustrating operation a node or device according to an example embodiment.

Example 30. FIG. 10 is a flow chart illustrating operation a node or device according to an example embodiment. The method of FIG. 10 may be directed to performing admission control for a flow. Operation 1010 includes determining a link capacity threshold value. Operation 1020 includes receiving a link capacity report indicating an available link capacity of at least one a child backhaul link or at least one access link of an integrated access backhauling (IAB) node within a wireless network. Operation 1030 includes receiving an admission request for a flow, including receiving a capacity requirement for the flow. Operation 1040 includes comparing the capacity requirement for the flow to the available link capacity of the IAB node. Operation 1050 includes determining that the flow is admissible if the capacity requirement of the flow is less than or equal to the available link capacity of the IAB node minus the link capacity threshold value (e.g., without sending a request for an updated link capacity report from the IAB node). And, operation 1060 includes determining that the flow is not admissible if the capacity requirement of the flow is greater than or equal to the available link capacity of the IAB node plus the link capacity threshold value (e.g., without sending a request for an updated link capacity report from the IAB node).

Example 31. The method of example 30, further comprising: sending a request to the IAB node for an updated link capacity report indicating an updated available link capacity of the IAB node, if the capacity requirement of the flow is greater than 1) the available link capacity of the IAB node minus the link capacity threshold value, and less than 2) the available link capacity of the IAB node plus the link capacity threshold value.

Example 32. The method of example 31, further comprising: performing admission control for the flow based on the updated link capacity of the IAB node.

Figure 11:
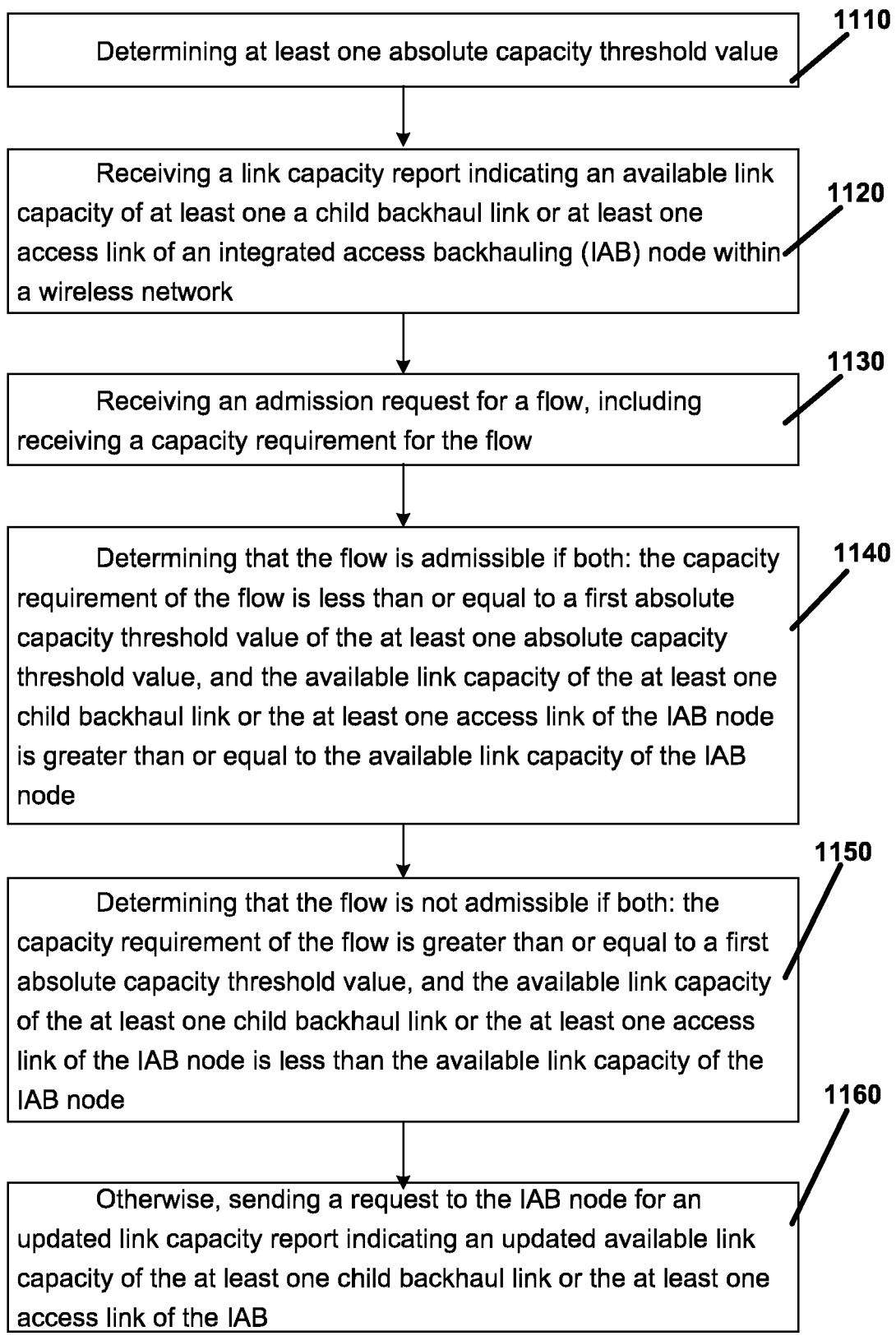
FIG. 11 is a flow chart illustrating operation of a node or device according to an example embodiment.

Example 33. FIG. 11 is a flow chart illustrating operation of a node or device according to an example embodiment. Operation 1110 includes determining at least one absolute capacity threshold value. Operation 1120 includes receiving a link capacity report indicating an available link capacity of at least one a child backhaul link or at least one access link of an integrated access backhauling (IAB) node within a wireless network. Operation 1130 includes receiving an admission request for a flow, including receiving a capacity requirement for the flow. Operation 1140 includes determining that the flow is admissible if both: the capacity requirement of the flow is less than or equal to a first absolute capacity threshold value of the at least one absolute capacity threshold value, and the available link capacity of the at least one child backhaul link or the at least one access link of the IAB node is greater than or equal to the available link capacity of the IAB node (e.g., without sending a request for an updated link capacity report from the IAB node). Operation 1150 includes determining that the flow is not admissible if both: the capacity requirement of the flow is greater than or equal to a first absolute capacity threshold value, and the available link capacity of the at least one child backhaul link or the at least one access link of the IAB node is less than the available link capacity of the IAB node (e.g., without sending a request for an updated link capacity report from the IAB node). Operation 1160 includes otherwise, sending a request to the IAB node for an updated link capacity report indicating an updated available link capacity of the at least one child backhaul link or the at least one access link of the IAB.

Example 34. The method of example 16, further comprising: performing admission control for the flow based on the updated link capacity indicating an updated available link capacity of the at least one child backhaul link or the at least one access link of the IAB node.

Example 35. An apparatus comprising means for performing the method of any of examples 18-34.

Example 36. A non-transitory computer-readable storage medium comprising instructions stored thereon that, when executed by at least one processor, are configured to cause a computing system to perform the method of any of examples 18-34.

Example 37. An apparatus comprising: at least one processor; and at least one memory including computer program code; the at least one memory and the computer program code configured to, with the at least one processor, cause the apparatus at least to perform the method of any of examples 18-34.

Example 38. A computer program comprising instructions which, when the program is executed by an apparatus, cause the apparatus to carry out the method of any of examples 18-34.

Figure 12:
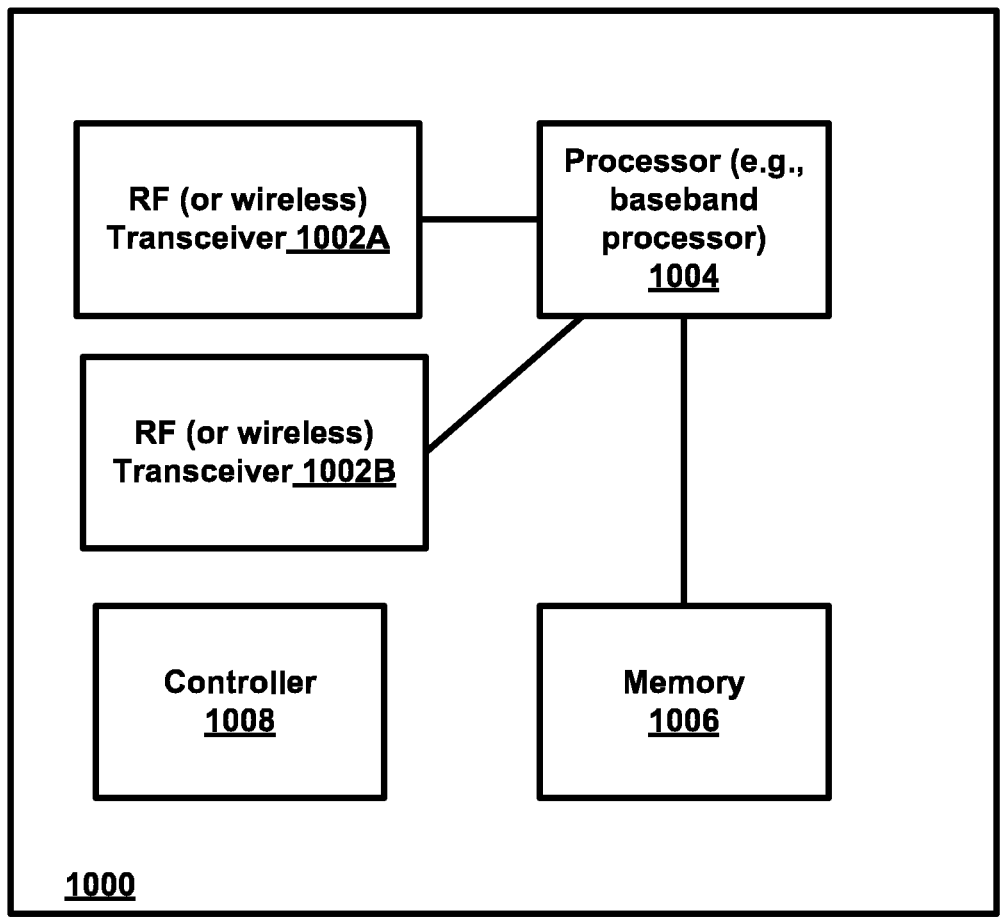
FIG. 12 is a block diagram of a wireless station or network node (e.g., AP, BS, gNB, RAN node, UE or user device, IAB node, relay node, or other node or network node) according to an example embodiment.

FIG. 12 is a block diagram of a wireless station or network node (e.g., AP, BS, gNB, RAN node, UE or user device, IAB node, relay node, or other network node) according to an example embodiment. The wireless station 1000 may include, for example, one or more (e.g., two as shown in FIG. 12) RF (radio frequency) or wireless transceivers 1002A, 1002B, where each wireless transceiver includes a transmitter to transmit signals and a receiver to receive signals. The wireless station also includes a processor or control unit/entity (controller) 1004 to execute instructions or software and control transmission and receptions of signals, and a memory 1006 to store data and/or instructions.

Processor 1004 may also make decisions or determinations, generate frames, packets or messages for transmission, decode received frames or messages for further processing, and other tasks or functions described herein. Processor 1004, which may be a baseband processor, for example, may generate messages, packets, frames or other signals for transmission via wireless transceiver 1002 (1002A or 1002B). Processor 1004 may control transmission of signals or messages over a wireless network, and may control the reception of signals or messages, etc., via a wireless network (e.g., after being down-converted by wireless transceiver 1002, for example). Processor 1004 may be programmable and capable of executing software or other instructions stored in memory or on other computer media to perform the various tasks and functions described above, such as one or more of the tasks or methods described above. Processor 1004 may be (or may include), for example, hardware, programmable logic, a programmable processor that executes software or firmware, and/or any combination of these. Using other terminology, processor 1004 and transceiver 1002 together may be considered as a wireless transmitter/receiver system, for example.

In addition, referring to FIG. 12, a controller (or processor) 1008 may execute software and instructions, and may provide overall control for the station 1000, and may provide control for other systems not shown in FIG. 12, such as controlling input/output devices (e.g., display, keypad), and/or may execute software for one or more applications that may be provided on wireless station 1000, such as, for example, an email program, audio/video applications, a word processor, a Voice over IP application, or other application or software.

In addition, a storage medium may be provided that includes stored instructions, which when executed by a controller or processor may result in the processor 1004, or other controller or processor, performing one or more of the functions or tasks described above.

According to another example embodiment, RF or wireless transceiver(s) 1002A/1002B may receive signals or data and/or transmit or send signals or data. Processor 1004 (and possibly transceivers 1002A/1002B) may control the RF or wireless transceiver 1002A or 1002B to receive, send, broadcast or transmit signals or data.

The embodiments are not, however, restricted to the system that is given as an example, but a person skilled in the art may apply the solution to other communication systems. Another example of a suitable communications system is the 5G system. It is assumed that network architecture in 5G will be quite similar to that of the LTE-advanced. 5G is likely to use multiple input—multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labor between core network operations and base station operations may differ from that of the LTE or even be non-existent.

Embodiments of the various techniques described herein may be implemented in digital electronic circuitry, or in computer hardware, firmware, software, or in combinations of them. Embodiments may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Embodiments may also be provided on a computer readable medium or computer readable storage medium, which may be a non-transitory medium. Embodiments of the various techniques may also include embodiments provided via transitory signals or media, and/or programs and/or software embodiments that are downloadable via the Internet or other network(s), either wired networks and/or wireless networks. In addition, embodiments may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, embodiments of the various techniques described herein may use a cyber-physical system (CPS) (a system of collaborating computational elements controlling physical entities). CPS may enable the embodiment and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various embodiments of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, embodiments may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments may be implemented in a computing system that includes a back-end component, e.g., as a data server, or that includes a middleware component, e.g., an application server, or that includes a front-end component, e.g., a client computer having a graphical user interface or a Web browser through which a user can interact with an embodiment, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described embodiments have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. An apparatus comprising:
at least one processor; and
at least one memory including computer program code;
the at least one memory and the computer program code configured to, with the at least one processor, cause the apparatus at least to:
transmit, to at least one integrated access backhauling (IAB) node within a wireless network, link capacity threshold information, wherein the at least one IAB node is requested to perform threshold-based reporting of updated link capacity based on the link capacity threshold information; and
receive, from a first IAB node of the at least one IAB node, an updated link capacity report that was triggered at the first IAB node based on a change of available link capacity of the first IAB node with respect to the link capacity threshold information, the updated link capacity report indicating changed available link capacity of at least one a child backhaul link or at least one access link of the first IAB node, the at least one memory and the computer program code being further configured to, with the at least one processor, cause the apparatus to:

receive, from the first IAB node of the at least one IAB node, an initial link capacity report indicating an initial link capacity of a child backhaul link and an access link of the first IAB node; and wherein being configured to cause the apparatus to receive the updated link capacity report comprises being configured to cause the apparatus to receive, from the first IAB node of the at least one IAB node, an updated link capacity report indicating updated available link capacity of the child backhaul link or the access link of the first IAB node, wherein the updated link capacity report was triggered at the first IAB node based on: 1) an available link capacity of the child backhaul link or the access link of the first IAB node, as compared to a last reported available link capacity, changes by more than a link capacity threshold value; and 2) an available link capacity of the child backhaul link or the access link of the first IAB node crosses at least one absolute capacity threshold value.

2. The apparatus of claim 1, wherein being configured to cause the apparatus to transmit the link capacity threshold information comprises being configured to cause the apparatus to transmit, to the at least one IAB node within the wireless network, a link capacity threshold value, wherein the at least one IAB node is requested to perform threshold-based reporting of updated link capacity if an available link capacity of a child backhaul link or an access link of the at least one IAB node changes by more than the link capacity threshold value.

3. The apparatus of claim 1, wherein:

the at least one IAB node is requested to perform threshold-based reporting of updated link capacity if an available link capacity of a child backhaul link or an access link of the at least one IAB node, as compared to a last reported available link capacity, changes by more than the link capacity threshold value.

4. The apparatus of claim 1, wherein being configured to cause the apparatus to transmit the link capacity threshold information comprises being configured to cause the apparatus to transmit, to the at least one IAB node within the wireless network, at least one absolute capacity threshold value, wherein the at least one IAB node is requested to perform threshold-based reporting of updated link capacity if an available link capacity of a child backhaul link or an access link of the at least one IAB node crosses at least one of the at least one absolute capacity threshold value.

5. The apparatus of claim 1, wherein a service flow for a user equipment is admissible along a route, if it is admissible over each backhaul link along the route and an access link to the user equipment at a serving IAB node and if a service flow is not admissible along a route, the network determines an alternate route and performs the admission control again, wherein the at least one IAB node sends a link capacity update report to a centralized unit only when it changes by a threshold configured by the network.

6. The apparatus of claim 1, further comprising being configured to cause the apparatus to:

transmit, to the at least one IAB node within a wireless network, a resource threshold value, wherein the at least one IAB node is requested to perform threshold-based reporting of updated resource availability of a child backhaul link or access link if the available resources of the child backhaul link or access link of the at least one IAB node changes by more than the resource threshold value; and receive, from a first IAB node of the at least one IAB node, an updated available resource report indicating updated available resources of the child backhaul link or the access link of the first IAB node, where the updated available resource report is triggered at the first IAB node based on the available resources of the child backhaul link or the access link of the first IAB node changing by more than the resource threshold value.

7. An apparatus, being an integrated access backhauling (IAB) node of a wireless network, comprising:

at least one processor; and at least one memory including computer program code;

the at least one memory and the computer program code configured to, with the at least one processor, cause the apparatus at least to:

receive link capacity threshold information, wherein the IAB node is requested to perform threshold-based reporting of updated link capacity based on the link capacity threshold information; and transmit an updated link capacity report that was triggered at the IAB node based on a change of available link capacity of the IAB node with respect to the link capacity threshold information, the updated link capacity report indicating changed available link capacity of at least one a child backhaul link or at least one access link of the IAB node, the at least one memory and the computer program code being further configured to, with the at least one processor, cause the apparatus to:

transmit an initial link capacity report indicating an initial link capacity of a child backhaul link and an access link of the IAB node;

detect a change in link capacity based on the following: 1) an available link capacity of the child backhaul link or the access link of the IAB node, as compared to a last reported available link capacity of a same link, has changed by at least a link capacity threshold value; and 2) an available link capacity of the child backhaul link or the access link of the first IAB node crosses at least one absolute capacity threshold value;

and wherein being configured to cause the apparatus to transmit the updated link capacity report comprises being configured to cause the apparatus to transmit, by the IAB node, an updated link capacity report indicating updated available link capacity of the child backhaul link and the access link of the IAB node in response to the detecting.

8. The apparatus of claim 7, wherein being configured to cause the apparatus to receive the link capacity threshold information comprises being configured to cause the apparatus to receive a link capacity threshold value, wherein the IAB node is requested to perform threshold-based reporting of updated link capacity if an available link capacity of a child backhaul link or an access link of the IAB node changes by either increasing or decreasing by more than the link capacity threshold value.

9. The apparatus of claim 7, wherein being configured to cause the apparatus to transmit the updated link capacity report comprises being configured to cause the apparatus to transmit an updated link capacity report if an available link capacity of a child backhaul link or an access link of the at least one IAB node, as compared to a last reported available link capacity, has changed by either increasing or decreasing by more than the link capacity threshold value.

10. The apparatus of claim 7, wherein being configured to cause the apparatus to receive the link capacity threshold information comprises being configured to cause the apparatus to receive at least one absolute capacity threshold value, wherein the IAB node is requested to perform threshold-based reporting of updated link capacity if an available link capacity of a child backhaul link or an access link of the IAB node crosses by changing or transitioning from being less than to greater than, or from being greater than to less than at least one of the at least one absolute capacity threshold value.

11. The apparatus of claim 7, wherein
a service flow for a user equipment is admissible along a route, if it is admissible over each backhaul link along the route and an access link to the user equipment at a serving IAB node and if a service flow is not admissible along a route, the network determines an alternate route and performs the admission control again, and
wherein the at least one IAB node sends a link capacity update report to a centralized unit only when it changes by a threshold configured by the network.

12. The apparatus of claim 7, further comprising being configured to cause the apparatus to:
receive a resource threshold value, wherein the IAB node is requested to perform threshold-based reporting of updated resource availability of a child backhaul link or access link if available time-frequency resources of the child backhaul link or access link of the IAB node changes by more than the resource threshold value;
detect that the available time-frequency resources of the child backhaul link or access link of the IAB node has changed, based on a last reported available resources, by more than the resource threshold value, and
transmit, in response to the detecting that the available time-frequency resources of the child backhaul link or access link of the IAB node has changed by more than the resource threshold value, an updated available resource report indicating changed available time-frequency resources of the child backhaul link or the access link of the first IAB node.

13. A method comprising:
transmitting, to at least one integrated access backhauling (IAB) node within a wireless network, link capacity threshold information, wherein the at least one IAB node is requested to perform threshold-based reporting of updated link capacity based on the link capacity threshold information; and
receiving, from a first IAB node of the at least one IAB node, an updated link capacity report that was triggered at the first IAB node based on a change of available link capacity of the first IAB node with respect to the capacity threshold information, the updated link capacity report indicating updated available link capacity of at least one a child backhaul link or at least one access link of the first IAB node,
the method further comprising:
receiving, from the first IAB node of the at least one IAB node, an initial link capacity report indicating an initial link capacity of a child backhaul link and an access link of the first IAB node;
wherein the receiving the updated link capacity report comprises receiving, from a first IAB node of the at least one IAB node, an updated link capacity report indicating updated available link capacity of the child backhaul link or the access link of the first IAB node, wherein the updated link capacity report was triggered at the first IAB node based on: 1) an available link capacity of the child backhaul link or the access link of the first IAB node, as compared to a last reported available link capacity, changes by more than a link capacity threshold value; and 2) an available link capacity of the child backhaul link or the access link of the first IAB node crosses at least one absolute capacity threshold value.

14. The method of claim 13, wherein:
the transmitting comprises transmitting, to at least one IAB node within the wireless network, a link capacity threshold value, wherein the at least one IAB node is requested to perform threshold-based reporting of updated link capacity if an available link capacity of a child backhaul link or an access link of the at least one IAB node changes by more than the link capacity threshold value.

15. The method of claim 13, wherein:
the at least one IAB node is requested to perform threshold-based reporting of updated link capacity if an available link capacity of a child backhaul link or an access link of the at least one IAB node, as compared to a last reported available link capacity, changes by more than the link capacity threshold value.

16. The method of claim 13, wherein:
the transmitting comprises transmitting, to the at least one IAB node within the wireless network, at least one absolute capacity threshold value, wherein the at least one IAB node is requested to perform threshold-based reporting of updated link capacity if an available link capacity of a child backhaul link or an access link of the at least one IAB node crosses at least one of the at least one absolute capacity threshold value.

17. The method of claim 13, wherein:
a service flow for a user equipment is admissible along a route, if it is admissible over each backhaul link along the route and an access link to the user equipment at a serving IAB node and if a service flow is not admissible along a route, the network determines an alternate route and performs the admission control again, and
wherein the at least one IAB node sends a link capacity update report to a centralized unit only when it changes by a threshold configured by the network.

18. The method of claim 13, further comprising:
transmitting, to the at least one IAB node within a wireless network, a resource threshold value, wherein the at least one IAB node is requested to perform threshold-based reporting of updated resource availability of a child backhaul link or access link if the available resources of the child backhaul link or access link of the at least one IAB node changes by more than the resource threshold value; and
receiving, from a first IAB node of the at least one IAB node, an updated available resource report indicating updated available resources of the child backhaul link or the access link of the first IAB node, where the updated available resource report is triggered at the first IAB node based on the available resources of the child backhaul link or the access link of the first IAB node changing by more than the resource threshold value.

19. A method comprising:
receiving, by an integrated access backhauling (IAB) node within a wireless network, link capacity threshold information, wherein the IAB node is requested to perform threshold-based reporting of updated link capacity based on the link capacity threshold information; and transmitting, by the IAB node, an updated link capacity report that was triggered at the IAB node based on a change of available link capacity of the IAB node with respect to the capacity threshold information, the updated link capacity report indicating updated changed available link capacity of at least one a child backhaul link or at least one access link of the IAB node, the method further comprising:

transmitting an initial link capacity report indicating an initial link capacity of a child backhaul link and an access link of the IAB node;

detecting a change in link capacity based on the following: 1) an available link capacity of the child backhaul link or the access link of the IAB node, as compared to a last reported available link capacity of a same link, has changed by at least a link capacity threshold value; and 2) an available link capacity of the child backhaul link or the access link of the first IAB node crosses at least one absolute capacity threshold value;

and transmitting the updated link capacity report comprises transmitting, by the IAB node, an updated link capacity report indicating updated available link capacity of the child backhaul link and the access link of the IAB node in response to the detecting.

20. A non-transitory computer-readable storage medium comprising instructions stored thereon that, when executed by at least one processor, are configured to cause a computing system to perform the method of claim 19.

* * * * *